US011529590B2

(12) United States Patent
Mathew et al.

(10) Patent No.: US 11,529,590 B2
(45) Date of Patent: Dec. 20, 2022

(54) DOUBLE-LAYERED CELLULOSE NANOFIBER MATERIAL, METHOD OF MANUFACTURING, MEMBRANES, AND USE THEREOF

(71) Applicant: Northron AB, Täby (SE)

(72) Inventors: Aji Pallikunnel Mathew, Taby (SE); Peng Liu, Taby (SE)

(73) Assignee: CELLUCIRCLE AB

( * ) Notice: Subject to any disclaimer, the term of this patent is extended or adjusted under 35 U.S.C. 154(b) by 0 days.

(21) Appl. No.: 16/768,798

(22) PCT Filed: Nov. 28, 2018

(86) PCT No.: PCT/EP2018/082818
§ 371 (c)(1),
(2) Date: Jun. 1, 2020

(87) PCT Pub. No.: WO2019/105998
PCT Pub. Date: Jun. 6, 2019

(65) Prior Publication Data
US 2021/0178337 A1    Jun. 17, 2021

(30) Foreign Application Priority Data

Dec. 1, 2017 (SE) .................................... 1751481-1

(51) Int. Cl.
*B01D 69/12* (2006.01)
*C01B 32/198* (2017.01)
(Continued)

(52) U.S. Cl.
CPC ......... *B01D 69/12* (2013.01); *B01D 67/0079* (2013.01); *B01D 67/0095* (2013.01);
(Continued)

(58) Field of Classification Search
None
See application file for complete search history.

(56) References Cited

U.S. PATENT DOCUMENTS

| | | | | |
|---|---|---|---|---|
| 2015/0141711 | A1* | 5/2015 | Chu ...................... | B01D 71/48 568/918 |
| 2015/0231577 | A1* | 8/2015 | Nair ..................... | B01D 71/024 210/640 |
| 2017/0157570 | A1* | 6/2017 | Chu ...................... | B01D 69/12 |

FOREIGN PATENT DOCUMENTS

| | | |
|---|---|---|
| WO | WO 2016/011124 | 1/2016 |
| WO | WO-2016/011124 A1 | 1/2016 |
| WO | WO-2017/197205 A1 | 11/2017 |

OTHER PUBLICATIONS

Supporting Information from High flux ethanol dehydration using nanofibrous membranes containing graphene oxide barrier layers, Tsung-Ming Yeh, Zhe Wang, Devinder Mahajan, Benjamin S. Hsiao, and Benjamin Chu, J. Mater. Chem. A, 2013,1, 12998-13003 (Year: 2013).*

(Continued)

*Primary Examiner* — Jason M Greene
*Assistant Examiner* — Eric J McCullough
(74) *Attorney, Agent, or Firm* — Marshall, Gerstein & Borun LLP

(57) ABSTRACT

A double-layered material consisting of a cellulose nanofibrous (CNF) layer and a graphene oxide (GO) nanolayer coating, wherein the material comprises 0.5-4 wt. % of GO, preferably 1-2 wt. % of GO, in relation to the total weight of the material is disclosed, as well as methods for producing said material, membranes comprising said material, and uses of said material and membranes Thus, the present invention provides a cellulose nanofiber material with a high flux, a good separation performance and a strong mechanical and structural stability in solution.

12 Claims, 7 Drawing Sheets

(51) Int. Cl.
  B01D 67/00  (2006.01)
  B01D 69/02  (2006.01)
  B01D 71/02  (2006.01)
  B01D 71/10  (2006.01)
  C02F 1/44  (2006.01)
  C02F 101/30  (2006.01)
(52) U.S. Cl.
  CPC ........... B01D 69/02 (2013.01); B01D 71/021 (2013.01); B01D 71/024 (2013.01); B01D 71/10 (2013.01); C01B 32/198 (2017.08); C02F 1/442 (2013.01); B01D 2323/12 (2013.01); B01D 2325/02 (2013.01); B01D 2325/04 (2013.01); B01D 2325/26 (2013.01); C02F 2101/308 (2013.01)

(56) References Cited

OTHER PUBLICATIONS

Ultrafine Polysaccharide Nanofibrous Membranes for Water Purification, Hongyang Ma, Christian Burger, Benjamin S. Hsiao, and Benjamin Chu, Biomacromolecules 2011 12 (4), 970-976 (Year: 2011).*

Akbari et al., "Large-area graphene-based nanofiltration membranes by shear alignment of discotic nematic liquid crystals of graphene oxide," Nat. Commun., Mar. 7, 2016, pp. 1-12.

Ao et al., "Superhydrophilic graphene oxide@electrospun cellulose nanofiber hybrid membrane for high-efficiency oil/water separation," Carbohydrate Polymers, Nov. 2017, 175:216-222.

Bano et al., "Graphene oxide modified polyamide nanofiltration membrane with improved flux and antifouling properties," J. Mater. Chem. A, Dec. 9, 2014, 5:2065-2071.

Beeran et al., "Mechanically strong, flexible and thermally stable graphene oxide/nanocellulosic films with enhanced dielectric properties," RSC Adv., Apr. 29, 2016, 49138-49149.

Cheng et al., "Robust construction of a graphene oxide barrier layer on a nanofibrous substrate assisted by the flexible poly (vinylalcohol) for efficient pervaporation desalination," J. Mater. Chem. A, Jan. 18, 2017, 7:3558-3568.

Chmelik et al., "Adsorption and diffusion—Basis for molecular understanding of permeation through molecular sieve membranes," Chem Ing Tech, Jan. 2011, 104-112.

Compton et al., "Tuning the mechanical properties of graphene oxide paper and its associated polymer nanocomposites by controlling cooperative intersheet hydrogen bonding," ACS Nano, Mar. 27, 2012, 6:2008-2019.

Fan et al., "TEMPO-mediated oxidation of β-chitin to prepare individual nanofibrils," Carbohydrate Polymers, Jul. 2009, 77:832-838.

Fang et al., "Freestanding bacterial cellulose-graphene oxide composite membranes with high mechanical strength for selective ion permeation," Sci. Rep., Sep. 12, 2016, 6:1-11.

Gao et al., "SWCNT-intercalated GO ultrathin films for ultrafast separation of molecules," J. Mater. Chem. A, Feb. 16, 2015, 12:6649-6654.

Gao et al., "Cellulose nanofibers/reduced graphene oxide flexible transparent conductive paper," Carbohydrate Polymers, Aug. 2013, 97:243-251.

Gendron et al., "Diffusion coefficients of several rhodamine derivatives as determined by pulsed field gradient-nuclear magnetic resonance and fluorescence correlation spectroscopy," J. Fluoresc., Apr. 23, 2008, 1093-1101.

Han et al., "Ultrathin graphene nanofiltration membrane for water purification," Adv. Funct. Mater., Feb. 26, 2013, 29(23):3693-3700.

He et al., "Promoted water transport across graphene oxide-poly(amide) thin film composite membranes and their antibacterial activity," Desalination, Jun. 2015, 365:126-135.

Hou et al., "Enhanced electrical conductivity of cellulose nanofiber/graphene Composite paper with a sandwich structure," ACS Sustainable Chemistry & Engineering, Jan. 21, 2018, 6:2983-2990.

Hu et al., "Enabling graphene oxide nanosheets as water separation membranes," Environ. Sci. Technol., Mar. 14, 2013, 47:3715-3723.

Huang et al., "Graphene oxide nanosheet: An emerging star material for novel separation membranes," J. Mater. Chem. Sep. 14, 2014, 2(34):13772-13782.

Iwamoto et al., "Elastic modulus of single cellulose microfibrils from tunicate measured by atomic force microscopy," Biomacromolecules, Sep. 14, 2009, 10:2571-2576.

Jonoobi et al., "Producing low-cost cellulose nanofiber from sludge as new source of raw materials," Industrial Crops and Products, Nov. 2012, 40:232-238.

Joshi et al., "Precise and ultrafast molecular sieving through graphene oxide membranes," Science, Feb. 14, 2014, 343(6172):752-754.

Karim et al., "Nanocellulose based functional membranes for water cleaning: Tailoring of mechanical properties, porosity and metal ion capture," J. Membr. Sci., Sep. 2, 2016, 418-428.

Karim et al., "Nanoporous membranes with cellulose nanocrystals as functional entity in chitosan: Removal of dyes from water," Carbohydr. Polym., Nov. 4, 2014, 112:668-676.

Karim et al.,"High-flux affinity membranes based on cellulose nanocomposites for removal of heavy metal ions from industrial effluents," RSC Adv., Feb. 16, 2016, 25:20644-20653.

Kim et al., "Highly crosslinked, chlorine tolerant polymer network entwined graphene oxide membrane for water desalination," J. Mater. Chem. A 5, Dec. 22, 2016, 1533-1540.

Liu et al., "Cellulose and chitin nanomaterials for capturing silver ions (Ag+) from water via surface adsorption," Cellulose, Feb. 2014, 21:449-461.

Liu et al., "Nanocelluloses and their phosphorylated derivatives for selective adsorption of Ag+, Cu2+ and Fe3+ from industrial effluents," J. Hazard. Mater., Aug. 30, 2015, 294:177-185.

Liu et al., "Surface adsorption and self-assembly of Cu(II) ions on TEMPO-oxidized cellulose nanofibers in aqueous media," J. Colloid Interface Sci., Feb. 15, 2016, 464:175-182.

Mathew et al., "Process scale up and characterization of wood cellulose nanocrystals hydrolysed using bioethanol pilot plant," Industrial Crops and Products, May 9, 2014, 58:212-219.

Mathew et al., "The effect of morphology and chemical characteristics of cellulose reinforcements on the ciystallinity of polylactic acid," J Appl Polym Sci., Apr. 25, 2006, 101:300-310.

Mautner et al., "Nanopapers for organic solvent nanofiltration," Chem. Commun., Apr. 1, 2014, 5778-5781.

Mi, "Graphene oxide membranes for ionic and molecular sieving," Science, Feb. 14, 2014, 740-742.

Mural et al., "Unimpeded permeation of water through biocidal graphene oxide sheets anchored on to 3D porous polyolefinic membranes," Nanoscale, Mar. 10, 2016, 15:8048-8057.

Nair et al., "Unimpeded permeation of water through helium-leak-tight graphene-based membranes," Science, Jan. 27, 2012, 442-444.

Park et al., "Graphene oxide papers modified by divalent ions—Enhancing mechanical properties via chemical cross-linking," ACS Nano., Mar. 2008, 572-578.

Park, D.A. Dikin, S.T. Nguyen, R.S. Ruoff, Graphene oxide sheets chemically cross-linked by polyallylamine, J. Phys. Chem. C 113 (2009) 15801-15804.

PCT International Search Report and Written Opinion in International Appln. No. PCT/EP2018/082818, dated Jan. 22, 2019, 9 pages.

Peng et al., "Ultrafast permeation of water through protein-based membranes," Nat. Nanotechnol., Apr. 26, 2009, 4(6):353-357.

Qiu et al., "Controllable corrugation of chemically converted graphene sheets in water and potential application for nanofiltration," Chem. Commun., Apr. 13, 2011, 5810-5812.

Saito et al., "Cellulose nanofibers prepared by TEMPO-mediated oxidation of native cellulose," Biomacromolecules, Jul. 13, 2007, 8:2485-2491.

Sajab et al., "Bifunctional graphene oxide-cellulose nanofibril aerogel loaded with Fe(iii) for the removal of cationic dye via simultaneous adsorption and Fenton oxidation," RSC Adv., Feb. 4, 2016, 19819-19825.

(56) References Cited

OTHER PUBLICATIONS

Sehaqui et al., "Enhancing adsorption of heavy metal ions onto biobased nanofibers from waste pulp residues for application in wastewater treatment," Cellulose, Jun. 7, 2014, 2831-2844.
Song et al., "Highly anisotropic thermal conductivity of layer-by-layer assembled nanofibrillated cellulose/graphene nanosheets hybrid films for thermal management," ACS Appl. Mater. Lnterfaces, Jan. 3, 2017, 9:2924-2932.
Sun et al., "Selective ion penetration of graphene oxide membranes," ACS Nano, Dec. 7, 2012, 7: 428-437.
Turbak et al., "Microfibrillated cellulose, a new cellulose product: properties, uses, and commercial potential," J. Appl. Polym. Sci. Appl. Polym. Symp., 1983, 37:815-827.
Van Der Bruggen et al., "A review of pressure-driven membrane processes in wastewater treatment and drinking water production," Environ. Prog., Apr. 2003, 22; 46-56.
Van der Bruggen et al., "Drawbacks of applying nanofiltration and how to avoid them: A review," Separation and Purification Technology, 2008, 2(63):251-263.
Van Reis et al., "Membrane separations in biotechnology," Curr. Opin. Biotechnol, Apr. 1, 2001, 12:208-211.
Vlasov et al., "Molecular-sized fluorescent nanodiamonds," Nat. Nanotechnol., Jan. 2014, 1:54-58.
Voisin et al., "Nanocellulose-Based Materials for Water Purification," Nanomaterials, Mar. 7, 2017, 7:57-69.
Vrijenhoek et al., "Influence of membrane surface properties on initial rate of colloidal fouling of reverse osmosis and nanofiltration membranes," J. Membr. Sci., Jun. 30, 2001, 115-128.
Xiong et al., "Ultrarobust Transparent Cellulose Nanocrystal-Graphene Membranes with High Electrical Conductivity," Adv Mater, Dec. 7, 2015, 28:1501-1509.
Xu & Qusay, "Polyethersulfone (PES) hollow fiber ultrafiltration membranes prepared by PES/non-solvent/NMP solution," J. Membr. Sci., Apr. 2004, 23 3(1-2):101-111.
Yan et al., "Preparation of poly(vinylidene fluoride)(pvdf) ultrafiltration membrane modified by nano-sized alumina (Al2O3) and its antifouling research," Polymer, Aug. 2005, 18(46)7701-7706.
Yeh et al., "On the origin of the stability of graphene oxide membranes in water," Nat. Chem., Jan. 2015, 7:166-170.
Yeh et al., "High flux ethanol dehydration using nanofibrous membranescontaining graphene oxide barrier layers," J. Mater. Chem. A, Aug. 2013, 41:12998-13003.
Zhang et al., "Graphene Oxide Quantum Dots Incorporated into a Thin Film Nanocomposite Membrane with High Flux and Antifouling Properties for Low-Pressure Nanofiltration," ACS Appl. Mater. Interfaces, Feb. 28, 2017, 9:11082-11094.
Zhang et al., "High-performance multifunctional TiO2nanowire ultrafiltration membrane with a hierarchical layer structure for water treatment," Adv. Funct. Mater., Dec. 3, 2009, 19(23):731-3736.
Zhang et al., "Green Solid electrolyte with cofunctionalized nanocellulose/graphene oxide interpenetrating network for electrochemical gas sensors," Small Methods, Sep. 25, 2017, 1-8.
Zhang et al., "Laminated cross-linked nanocellulose/graphene oxide 1-12 electrolyte for flexible rechargable zinc-air batteries," Adv. Energy Mater, May 17, 2016, 6:1-8.
Zhu et al., "Graphene-based antimicrobial polymeric membranes: a review," J. Mater. Chem. A 5, Feb. 28, 2017, 15:6776-6793.
Zhu et al., "Self-Assembled TEMPO Cellulose Nanofibers: Graphene Oxide-Based Biohybrids for Water Purification," ACS Applied Materials and Interfaces, Jun. 21, 2017, 21048-21058.
Examination Report from Indian Patent Application No. 202037027673 dated Mar. 14, 2022.

* cited by examiner (a) Top-view of the membranes (b) SEM top-view images (c) AFM top-view images (d) The cross-section SEM images (a)

(b)

(c)

(d)

DOUBLE-LAYERED CELLULOSE NANOFIBER MATERIAL, METHOD OF MANUFACTURING, MEMBRANES, AND USE THEREOF

CROSS REFERENCE TO RELATED APPLICATIONS

This application is a National Phase application under 35 U.S.C. § 371 of PCT International Application No. PCT/EP2018/082818 filed Nov. 28, 2018, which claims priority to Sweden Provisional Patent Application No. 1751481-1 filed Dec. 1, 2017. The entire contents of the foregoing applications are hereby incorporated by reference.

TECHNICAL FIELD

The present application relates to the field of cellulose nanofiber materials, and in particular to a double-layered cellulose nanofiber based material.

BACKGROUND ART

Advances in design and synthesis of pressure driven separation membranes that enable ultrafast permeation, good retention, highly selectivity and cost effectiveness will have a tremendous impact in many fields including waste water purification [1, 2], desalination[3], food industry [4] and bio-pharmaceuticals[5]etc.[6, 7] Nowadays conventional separation membranes, such as polymeric membranes and ceramic membranes have been extensively studied and used for water purification with good separation performance. [8, 9] However, polymeric membranes are limited in resistance to chemicals, strong acid and base, high temperature and high compression. [10] Although with excellent chemical inertness, ceramic membranes are normally confined to research use and special use applications owing to their brittleness, high cost and complex process of membrane fabrication. [11]

Membranes fabricated from graphene oxide (GO) combines the merits of both polymeric and ceramic membranes. [12] Due to its unique two-dimensional mono-atom thick asymmetrical structure and the oxygen-containing functional groups on the edges of the basal plan, graphene oxide nanosheets are equipped with high chemical resistance and can be easily dispersed and processed in liquid phase like polymers. [6, 13, 14] Besides, GO nanosheets exhibit outstanding mechanical strength, negatively charged surface and low flow friction with water molecules[15], which are very beneficial for the fabrication of high performance separation membranes. GO membranes with laminar structure can be assembled from GO nanosheets by several methods, such as vacuum filtration, layer-by-layer deposition, drop casting and spin coating.[16] And among them, vacuum filtration is the most common used method due to the simplicity of the required facilities and low cost. [17]

In spite of the plenty of encouraging merits, pristine GO membranes suffer from two main shortcomings: low permeation flux and weak structural stability in wet state. [6, 18] Due to its narrow interlayer spacing between GO nanosheets, the water permeation through the stacked GO nanosheets is low and insufficient to compete with commercial polymeric pressure-driven membranes. [19] Akbar et al. reported that the water permeability of GO membranes prepared by vacuum filtration ranged from zero to 95 $Lm^{-2}$ $h^{-1}$ $bar^{-1}$, when the membrane thickness goes down from 400 nm to 50 nm. [13] Secondly, in water medium, GO nanosheets become negatively charged, leading to membrane disintegration caused by electrostatic repulsion. The poor wet stability makes neat free-standing GO membranes prepared by simple filtration hardly survive from the high-pressure cross-flow filtration conditions.[18]

In order to improve the poor water permeability of GO membranes, thin film composite (TFC) technology, which an extremely thin layer of GO functioning as selective separation layer deposited on a porous support, was applied in some studies. [3, 20-23] In these studies, chemical cross-linkers such as multivalent metal ions[24], polyallylamine [25], citric acid [20] and maleic acids [21] etc. were used to strengthen the mechanical property of the membranes with GO thin top layer under wet condition. Nevertheless, there is a great risk that the chemical crosslinking narrows the water passage and decreases the water permeability of the GO membrane. Hu et al. reported that the water permeation of GO membrane dropped from 27.6 $Lm^{-2}$ $h^{-1}$ $bar^{1}$ to 8.4 $Lm^{-2}$ $h^{-1}$ bar after crosslinking by polydopamine. [26]

Nanocellulose including cellulose nanocrystals (CNC), cellulose nanofibers (CNF) and their modified derivatives have been extensively studied in our group, especially for the application of water purification. [27-33] CNF with the diameters as low as 3 nm and high respect ratio (greater than 250) can be obtained by fibrillation (homogenization, microfluidization or ultrafine grinding) of cellulose biomass. [27, 34-36] Karim et al. [37] fabricated membranes by using CNF as nanofibrous substrate for the removal of heavy metal ions and Liu et al. studied the metal adsorption performance of CNF in aqueous environment[38, 39]. The properties of CNF such as high modulus, good flexibility, high crystallinity and low thermal expansion make CNF an ideal material for forming porous support. [40, 41] However, the challenges including shortage of functionality, low water permeation and relatively weak wet stability of the CNF substrate remains to be solved.

Zhu et al. (2017) successfully prepared the biohybrids composed by TEMPO mediated oxidation cellulose nanofibers (TOCNF) and GO nanosheets and the hybrids exhibited promising adsorption capacity towards Cu(II). [43] The composite material fabrication of nanocellulose and GO had also been investigated for electronic applications under dried conditions. [41, 44] Fang et al. (2016) developed bacterial cellulose-GO composite separation membranes with formamide as chemical crosslinker. [17]

SUMMARY OF THE INVENTION

It is an object of the present invention to provide cellulose nanofiber materials with a high flux, a good separation performance and a strong mechanical and structural stability in solution. It is further an object of the present invention to provide such cellulose nanofiber materials that do not need to have a chemical cross-linker added during manufacturing and present within the material.

The objects above are attained by according to a first aspect providing a double-layered material consisting of a cellulose nanofibrous (CNF) layer and a graphene oxide (GO) nanolayer coating, wherein the material comprises 0.5-4 wt. % of GO, preferably 1-2 wt. % of GO, in relation to the total weight of the material.

In one embodiment of the first aspect, the material has a pore size that is 5-10 nm as measured with the Barrett-Joyner-Halenda (BJH) method.

In a further embodiment of the first aspect, the double-layered material having one surface with the GO nanolayer, the surface zeta potential of the surface with the GO nanolayer is below −50 mV.

According to a second aspect, use of the double-layered material above is provided, as a separation membrane for the purpose of separation of particles from an aqueous solution.

According to a third aspect a separation membrane is provided, said membrane comprising the double-layered material according the above.

According to a fourth aspect, a method is provided for purification of waste water, comprising allowing the water intended to be purified to pass through the material or membrane according to the above, such that particles present in said water will be removed from the water by said material or membrane.

According to a fifth aspect, a method for manufacturing the double-layered material or the membrane above is provded, said method comprising the steps of:

a) obtaining a CNF suspension, dispersing said suspension in water, and sonicating said dispersion;
b) forming a CNF layer of the CNF dispersion formed in step a);
c) obtaining a GO suspension in water, dispersing said suspension in water, and sonicating said dispersion;
d) applying the GO dispersion formed in step c) as a coating on top of the CNF layer formed in step b) to obtain a double-layered material;
e) drying the double-layered material obtained in step d).

According to one embodiment of the fifth aspect, steps b) and d) are performed using vacuum filtration, and in step b) the CNF layer is formed on a substrate filter paper, and further comprising a step f) peeling off the double-layered material from the substrate filter paper.

According to other embodiments of the fifth aspect, the double-layered material is formed by roller coating, spin coating, or spray coating.

DETAILED DESCRIPTION

Figure 1:
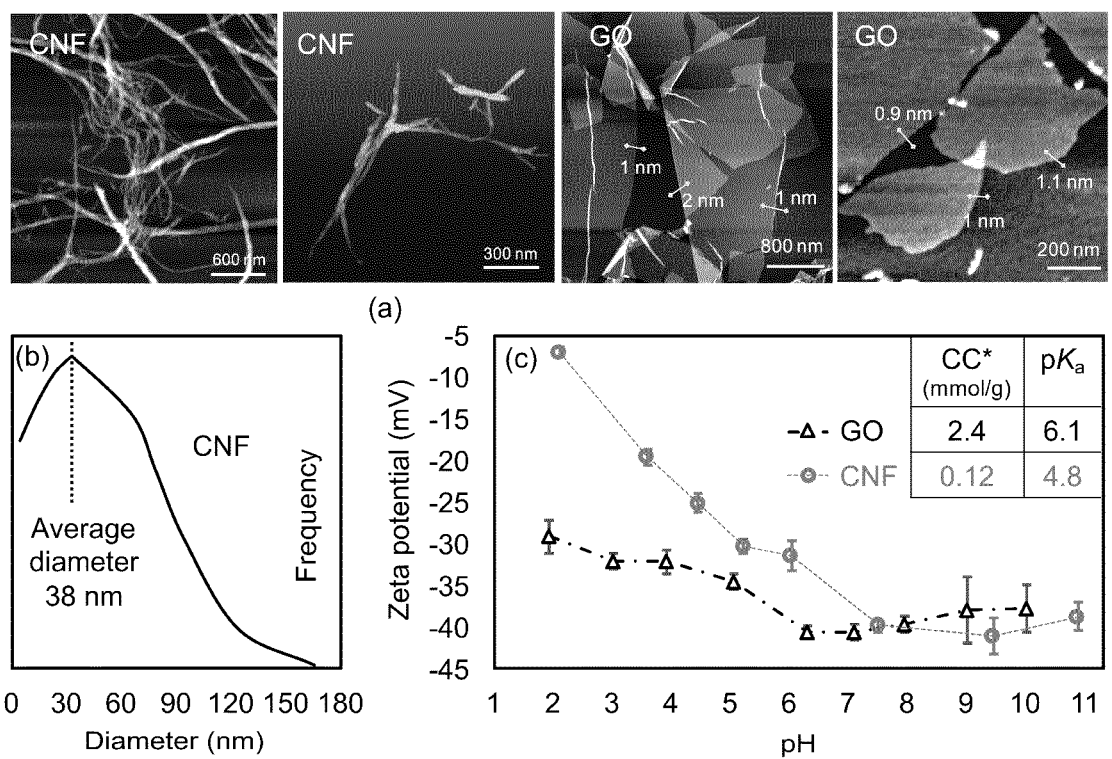
FIG. 1. Characterizations of CNF and GO. (a) Morphologies detected using Atomic Force Microscopy (AFM) (b) CNF diameter distribution (c) *Charge contents (CC), $pK_a$ of the acidic functional groups and the zeta potentials as a function of pH.

The present invention relates to a double-layered material consisting of a cellulose nanofiber (CNF) layer, and a Graphene oxide (GO) nanolayer coated onto the CNF layer.

CNF is a material composed of nanosized cellulose fibrils with a high aspect ratio (length to width ratio). Typical fibril widths are 5-100 nanometers, preferably 5-40 nanometers, and more preferably 5-20 nanometers with a wide range of lengths. The CNF material used for the CNF layer according to the invention may originate from any source, as long as the fibril width defined above is respected. The source for the CNF may be a wood source, such as hardwood or softwood, or the source may be tunicates.

GO is a single-layer form of graphite. GO layers, or GO nanosheets, are about 1.1±0.2 nm thick.

The inventors have surprisingly discovered that by applying an ultrathin GO nanolayer coating onto a CNF layer, a double-layered material is provided with unexpected properties. The double-layered material may have a thickness of 15-50 µm. Below 15 µm the material will be unstable. Above 50 µm, the usability of the material will decrease. The thickness of the double-layered material is preferably 19.3±4.0 µm, that is 15.3-23.3 µm. The GO coating has a thickness of 50-450 nm, preferably 100-220 nm.

The mass ratio of GO:CNF of the materials according to the above range from 0.5:100 (GC0.5) to 4:100 (GC4), corresponding to from 0.5 wt. % to 4 wt. % of GO to the total weight of the material. Preferably the mass ratio of GO:CNF is from 1:100 (GC1) to 2:100 (GC2), corresponding to from 1 wt. % to 2 wt. % of GO to the total weight of the material.

The average pore sizes of the double-layered material according to the above, measured by using bubble point method and mean flow pore size measurement, are in the range of 0.1 to 0.3 µm. The pore size is preferably 5-10 nm as measured with the Barrett-Joyner-Halenda (BJH) method.

In the present disclosure, the inventors show that a double-layered material according to the appended claims has an improved modulus and strength, as compared to a material comprising CNF alone, or an isotropic single layered material (GC1-5) manufactured by a mixed suspension of GO and CNF, comprising the same ratio in total of GO:CNF. These properties are improved for the materials both in a wet state, with a 127-533% increase in modulus and a 421-833% increase in strength compared to CNF alone, and in a dry state, with a 30-38% increase in modulus and a 48-59% increase in strength compared to CNF alone. Additionally, the redried material, after having been wet, has a higher strain than the corresponding dry material. Taken together, this implies that the material can be reused without any significant loss of modulus or strength, after use in an aqueous environment.

The double-layered material according to the above has a negative surface zeta potential, below −50 mV. Thereby the materials have a negatively charged surface, which leads to a good fouling resistance. Furthermore, the double-layered material according to the present invention has a higher hydrophobic nature, which improves the wet structural stability of the material.

Furthermore, the double-layered material according to the above has significantly improved water permeability at very thin GO coating thickness. The double-layered materials comprising 0.5, 1 and 2 wt. % of GO in total in a nanolayer coated on the CNF layer, show a remarkable increase. GC1 shows a 561% increase in water permeability as compared to CNF alone. A thicker GO layer (GC4) has a negative impact on the water permeability, with a decrease of nearly 80% compared to CNF alone. However, GC4 still has considerably higher water permeability than a pure GO film, with about 1600% increase compared to thermally corrugated GO membranes [50], and about 760% increase compared to pristine GO membranes [13].

As described in more detail in the Experimental section below, it is believed that the improved water permeability for the thinner GO coatings can be attributed to the presence of "standing inserted GO sheets". These are GO sheets that are inserted perpendicularly into the CNF layer in relation to the direction of the coating. Thus, spacings are created at the interface between the inserted GO nanosheets and the CNF material, forming perpendicular "nanochannels" that facilitates the transport of water through the membranes (see FIG. 6b). These perpendicular GO sheets are not observed at thicker GO coatings, as the "nanochannels" in these cases are shielded off by the additional GO nanosheets, and thus not available for water delivery. The presence of "standing inserted GO sheets" further means that the GO nanosheet layer in part extends into the CNF layer, and there may not be a distinct interface between the two layers in the double-layered material The double-layered material according to the above has improved dye retention efficiency as compared to CNF alone, a commercial nylon membrane, or the isotropic single layered material (GC1-5) (see FIGS. 7, 8 and 9). The dye retention is due to both affinity of the dyes to the material, but may also be due to a size exclusion effect. Thus, the material may be efficient in water purification.

The double-layered material according to the above may be used in the form of a membrane for purification of water from pollutants. Most pollutants in an aqueous solution such as in water are in an ionic, and thus charged, form. Thus, the membrane will be able to bind or adsorb the pollutants while allowing the water to flow through the membrane. Furthermore, captured ions on the surface of the double-layered material may form clusters, and such clusters may provide the material with additional size exclusion properties.

According to the present invention, also a method for manufacturing the double-layered material according to the above is provided. In this method a CNF suspension is dispersed in water and then sonicated. Thereafter the resulting CNF dispersion is used to form a CNF layer, preferably on a substrate. Thereafter, a GO suspension is dispersed in water and sonicated. The resulting GO dispersion is applied as a coating on top of the above formed CNF layer.

The double-layered material according to the above shows strong interactions between adjacent GO nanosheets, as well as strong interactions between the GO nanosheets and the CNF layer. Furthermore, the stability of the material is strengthened by an increased membrane surface hydrophobic property as compared to a CNF material without GO. A chemical cross-linking agent would narrow the water passage and decrease the water permeability. As a strong interaction between the two layers already has been accomplished, there is therefore no chemical cross-linking agent added to any of the suspensions, as this would negatively impact the functional properties of the material. Consequently, the double-layered material according to the above does not comprise any chemical cross-linking agent.

The method may be performed by vacuum filtration. It may also be performed by roller coating, spin coating, spray coating, or any other suitable method for obtaining a double-layered material and for obtaining layers with the thickness required according to the above.

A substrate may be used upon which the CNF layer is formed. When vacuum filtration is used, the substrate can be any biobased nonwoven substrate used within the field. The substrate may be a filter paper.

After the formation of the double-layered material, it is dried. It may for instance be dried at ambient temperature, typically 23° C. The drying period is normally about 48 hours under under a load of 40N. Once dried, the material may be easily removed from the substrate if used, such as being easily peeled off from a filter paper.

Accordingly, a double-layered material consisting of a CNF layer and an ultrathin GO nanolayer coating is provided, wherein said material has improved properties regarding stability and strength, water permeation, dye retention and adhesion of charged particles over previously known materials within the field.

The double-layered material according to the above, or a membrane thereof, may be used for the purpose of separation of particles from an aqueous solution. It may relate to separation of charged particles, both positively and/or negatively charged particles, or non-charged particles. The double layered material may thus be used within the field of water purification, desalination, within the food industry, pharmaceuticals and/or biomedicine. It may furthermore relate to for instance decolorization of dye waste water, pesticide and bacteria filtration, concentration and recovery of milk, separation of brewage microorganisms, or urine dialysis membranes.

Experimental Section

Materials

Cellulose nanofibers (CNF) used for the preparation of membranes was a commercial product, supplied by Borregard Exilva, Norway. The dry weight content of cellulose nanofibers in the suspension was 1.8%. The CNF was used with no additional treatment.

Graphene oxide (GO) dispersion in water with a concentration of 4 mg/mL was purchased from Sigma-Aldrich (Sweden) and was diluted into different concentrations as required.

Processing Methods of GO-CNF (GC) Membranes 26.67 g CNF suspension (1.8%) was dispersed into 0.6 L water and sonicated for 10 minutes. Then 0.6 L CNF suspension was vacuum filtered (Munktell filter paper, grade 1) to prepare the CNF layer (CNF dry weight: 0.48 g) of the composite double layered membrane. Four different volumes (0.6, 1.2, 2.4, 4.8 ml) of GO suspensions (4 mg/mL) were dispersed into 0.6 L water and sonicated for 30 minutes in ice bath. GO suspension was vacuum filtered on top of the CNF layer and formed ultrathin GO top layer (GO weight: 2.4 mg to 19.2 mg). After double filtrations, the double-layered membranes were dried in ambient conditions for approximately 48 hours under pressure (load of 40N). Then the dried membranes were easily peeled off from the substrate filter paper.

Unlike double layered membranes, isotropic single layered membrane (GC-S1) was fabricated by using vacuum filtration of the mixed suspension of GO and CNF at the mass ratio of 1 to 100 (GC1-S). Table 1 shows the fabrication parameters of pure CNF film and the composite GC membranes. All membranes had a diameter of 175 mm.

TABLE 1

Membrane fabrication parameters

| Membrane | Membrane structure | Mass ratio (GO/ CNF) | GO (g/m$^2$) | CNF (g/m$^2$) | Filtration time (min) |
|---|---|---|---|---|---|
| CNF | substrate | 0/ 100 | 0 |  | 3 |
| GC0.5 |  | 0.5:100 | 0.1 |  | 3 + 9 |
| GC1 | double layered | 1:100 | 0.2 | 20 | 3 + 13 |
| GC2 |  | 2:100 | 0.4 |  | 3 + 24 |
| GC4 |  | 4:100 | 0.8 |  | 3 + 17 |
| GC1-S | isotropic single layered | 1:100 | 0.1 | 20 | 11 |

Characterization
Atomic Force Microscopy (AFM)

The morphology of cellulose nanofibers, graphene oxide nanosheets and the GC membranes were performed with a Fast Scan AFM (Bruker, Nanoscope controller, Santa Barbara, Calif., USA). The CNF suspension and GO solution were separately drop coated on the metal pug substrate and dried in air before analysis. The membranes were directly glued on the metal pugs. The height sensor, peak force error images were recorded using the probe (Model: ScanAsystair, Bruker) under Peak Force tapping mode. The spring constant and deflection sensitivity was carefully calibrated before and after experiments and kept constant. The collected data were processed with software NanoScope Analysis 1.5 (Bruker).

Scanning Electron Microscopy (SEM)

The morphology, uniformity and continuity of the membrane samples were obtained by using field emission scanning electron microscope (JSM-7401F, Japan). All membrane samples were coated with gold by a sputter coater (JEOL, JFC-1200) for 30 seconds. The coatings were less than 10 nm in thickness. For cross-sectional imaging, the free-standing composite membranes were cut into rectangular strips, submerged in liquid nitrogen for 20 s and carefully snapped with tweezers or cut with a scalpel. The cross section was then imaged by a scanning electron microscope (JSM 7401F) operating at low voltage (1 or 2 kV) by using the side mounted secondary electron detector.

Pore Size

Pore size of the membranes were determined by N2 adsorption using BET method with sample-degassed instrument (Gemini VII 2390 Surface Area Analyzer) at 110° C. for 24 h in dry N2 flow. The average pore size of the membranes was also measured using bubble point method using CapillaryFlow Porometer. The initial setting pressure was 1-80 psi, measured by wet-dry method. The measurement was repeated three times for each membrane sample.

Contact Angle Measurement

Water contact angles were measured on membrane samples using the sessile drop technique. A Dynamic Absorption Tester (68-96 DAT) was used to record the contact angles of the water sessile drops on the film samples as a function of time. The contact angles between the membranes and water were plotted as a function of time.

Zeta Potential

The zeta potentials of GO and TOCN at different pH were measured using Zeta sizer nano ZS, Malvern (UK) at 25° C. The concentrations of all the measured samples remain the same at 0.05% wt.

Surface zeta potential measurement of the membranes was carried out using the same zetasizer equipped with the corresponding surface zeta potential cell. Measurements were performed at 25° C. using 10 mM KCl at pH 7.0, aqueous solution with 0.5% (w/w) polyacrylic acid (450 k Da) as tracer. Measurements were conducted at 25° C. at six different distances from sample surface in order to calculate surface Zeta potential. pH was adjusted using 1M KOH and 1 M HCl. The zeta potential (0 was calculated according to Helmholtz-Smoluchowski equation.

Surface Charge Content

Surface charge content of CNF and GO nanosheets were determined by the electric conductivity titration method. 5 ml of NaCl at 0.01 M was added to 0.05 g CNF (or 0.01 g GO) suspended in 85 ml of water and the mixture was stirred. Hydrochloric acid was added to the mixture to set the pH to 2.5-3, and then the mixture was titrated by several additions of 0.01 M NaOH solution while the electrical conductivity and the pH of the solution were measured. This was continued until the pH of the suspension reached 11. The negative charged content was determined from the middle line of the curve showing electrical conductivity vs volume of NaOH added. All data of suspension conductivity changes were set down and plotted. The surface charge was calculated from the volume of NaOH added for neutralization of the weak acidic functional groups on the surface. [45] The same method was also applied to measure the charge content of GO nanosheets.

Mechanical Properties

The Young's modulus (Mpa), maximum tensile strength (Mpa) and the strain at break (%) of the dried, wet and re-dried membrane samples were measured by using Instron 5566 Universal Testing Machine. For the testing, the membrane samples were cut into sizes of 1 cm×4 cm and mounted vertically with two clamps at a distance of 2 cm, and tested at a speed of 1 mm/min with a 2 kN load cell.

Flux Measurement

The flux of the membranes was measured by quantifying the volume of water passing through membrane under certain pressure. Prior to the measurements, membranes were cut into the required size (48 mm) for filtration tests. The effective membranes area was 9.6 cm$^2$ and all the measurements were performed at ambient conditions under a constant pressure of 0.9 bar. The quantity of water that passed through the membrane for a defined time interval was measured and calculated in the standard unit of $L \cdot m^{-2} \cdot h^{-1} \cdot bar^{-1}$. Flux measurement for each membrane sample was repeated four times.

Dye Retention Performance

Dye stock solution containing a mixture of Victoria blue B, Methyl Violet 2B and Rhodamine 6G with a concentration of 2 mg/L for each dye was prepared. Hence the total dye concentration of the solution was 6 mg/L with the pH condition of 7.17. A certain volume of the dye solution (30 ml) were pressured through the membrane at ambient conditions under a constant pressure of 0.9 bar The effective membranes area was 9.6 cm$^2$. The time consumed for filtration was recorded and the flux of the dye solution was calculated in the unit of $L \cdot m^{-2} \cdot h^{-1} \cdot bar^{-1}$. Each measurement was repeated twice.

The quantitative analysis of dye removal in the permeated dye solution was determined by UV-vis spectrophotometer (Perkin Elmer, Lambda 2S, Sweden). The dye removal percentage was calculated by the formula given below:

$$\left(1 - \frac{A_t}{A_0}\right) \times 100\%$$

Where $A_0$ is the absorbance of the stock dye solution and $A_t$ is the absorbance of the dye solution permeated through the composite membranes. The absorbance of each dye was recorded at their $\lambda_{max}$ (see more information about the dye probe molecules listed in Table 2)), that determined by using UV-spectrophotometer.

TABLE 2 information on the targeted dyes

| Name of dyes | Nomenclature in text | $\lambda_{max}$ | Molecular weight | Hydrodynamic radius (nm) | Surface charge |
|---|---|---|---|---|---|
| Victoria blue B | VBB | 592 nm | 506 | 0.94 | + |
| Methyl Violet 2B | MV2 | 584 nm | 399 | 0.65 | + |
| Rhodamine 6G | R6G | 526 nm | 479 | 0.60 [38, 39] | − |

Dye Adsorption Studies of the Membranes

Dye stock solution containing a mixture of Victoria blue B (VBB), Methyl Violet 2B (MV2) and Rhodamine 6G (R6G) with a concentration of 2 mg/L for each dye was prepared for sorption studies. 0.0192 g of the membranes (CNF and GC1) with the diameter of 35 mm were soaked into 30 ml of the dye stock solution respectively at ambient conditions with magnetic stirring. Dye solution samples with a certain volume were collected at 1 h, 3 h, 6, 12 h, 24 h, and 48 h and analyzed by UV-vis spectroscopy same as described in the dye filtration studies. The dye removal percentage due to membrane adsorption was calculated.

Results and Discussion

Characterizations of Cellulose Nanofibers (CNF) and Graphene Oxide (GO)

As displayed in FIG. 1 (a, b), the diameters of the cellulose nanofibers are widely distributed from 5 nm to more than 100 nanometers and the average diameter calculated based on 34 random measurements using AFM is 38 nm. GO nanosheets have irregular shapes with varied lateral width, ranging from hundreds of nanometers to several micrometers, which are significantly larger than the diameter of CNF and CNF bundles. As displayed in FIG. 1(a), the thickness of the single GO nanosheet is very uniform in the range of 0.9 to 1.1 nm. Hence during the fabrication of GC membrane, a single GO nanosheet could cover many cellulose nanofibers or fiber bundles beneath it whereas CNF fibrils can wrap around the GO sheets, as reported in our recent study. [43]

The zeta potentials of both CNF and GO remain negative in the whole studied pH range and reach the lowest value around neutral pH, owing to the negatively charged functional groups (—COO−) on their surfaces (FIG. 1 c). Although CNF and GO have similar zeta potential values (around −40 mV) at neutral pH, the zeta potentials of CNF (−7 mV at pH 2) is much more susceptible to low pH variations than GO (−29 mV at pH 1.9). Carboxyl group is the acidic charged entity presented on both CNF[46] and GO, however, according to the charge contents (CC) displayed in FIG. 1 (c), GO has a high carboxyl group content (2.4 mmol/g), which is 20 times higher than that of CNF.

The $pK_a$ values indicate that most of the carboxyl groups on the surface of both CNF and GO are in the unpronated form (—COO−) at neutral pH.

Structure and Surface Characteristics of the Layered GO-CNF (GC) Membranes

Figure 2:
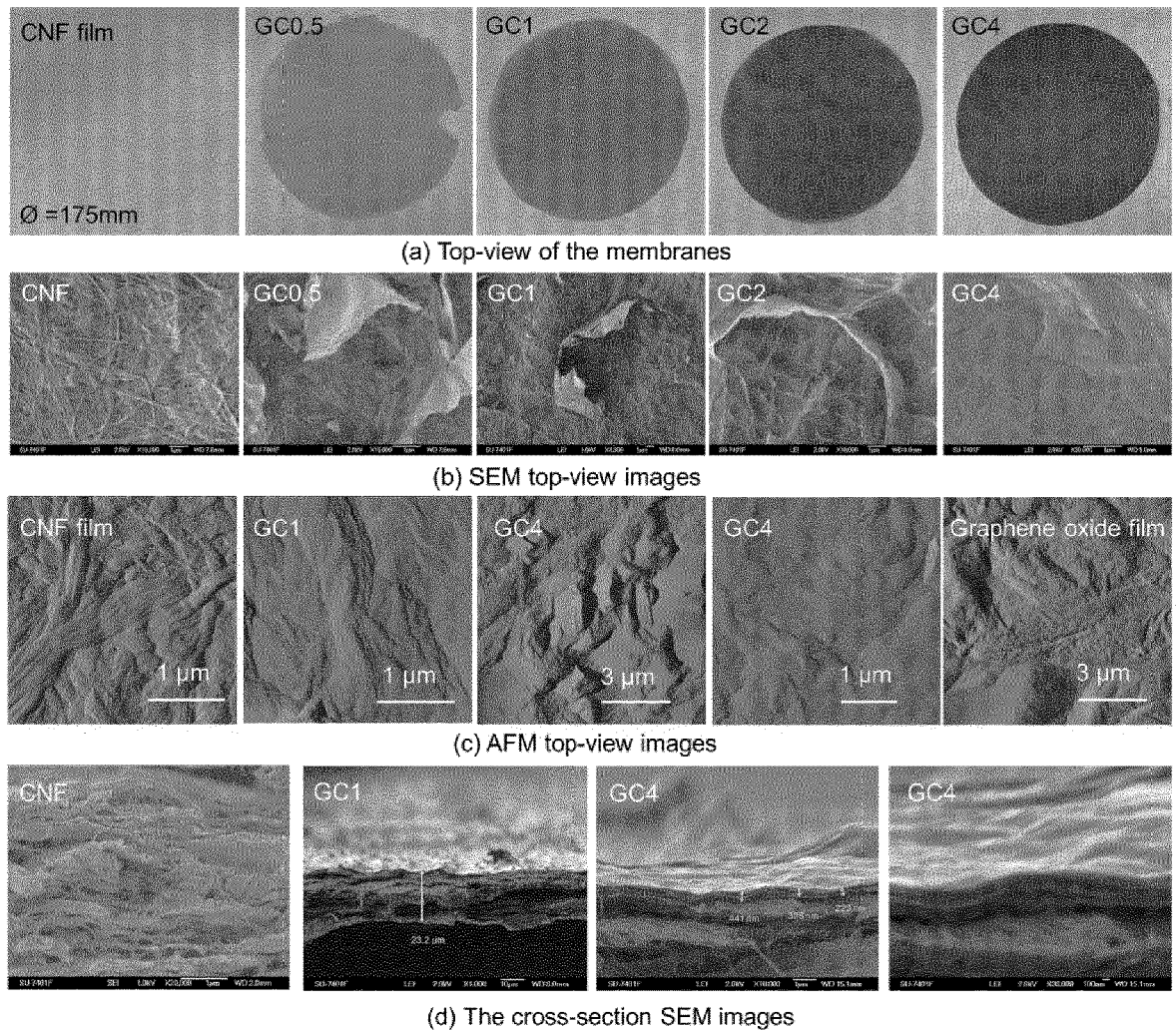
FIG. 2. Membrane morphologies. (a) Top-view images. (b) Scanning Electron Microscopy (SEM) top-view images. (c) AFM top-view images. (d) SEM cross-section images.

GC membranes were fabricated by two sequential vacuum filtrations of CNF suspension and GO suspension with a certain mass ratio of GO to CNF (shown in Table.1). The morphologies of the double layered GC membranes with different mass ratios of GO to CNF are displayed in FIG. 2. As shown in the figure, the color of the GC membranes darkens (FIG. 2 (a)) and the visibility through CNC fibrous s layer decreased (FIG. 2 (b), (c)) with the increasing mass ratio of GO to CNF. The faintly visible topography of the cellulose nanofibrous networks beneath the GO layer (GC0.5, GC1, GC2) in the SEM and AFM top-view images indicate the tight contact of ultrathin GO layer and CNF layer. A structure of GO sheets aligned perpendicular to the membrane surface ("standing inserted") was widely observed on the surface of membranes GC0.5, GC1 and GC2 as displayed in FIG. 2(b), while the same structure was rarely detected on the surface of GC4. The structure of "standing inserted GO sheets" might also substantially increase the corresponding surface roughness as what is shown in FIG. 2 (b). The cross-section of the doubled layered GC membranes is presented in FIG. 4 (d). Due to the relative low GO mass loading (0.2 g/m²) on GC1, a single laminate layer of GO was observed on CNF layer. However, when the GO mass loading is increased to 0.8 g/m², dense GO laminates are detected on the surface of GC4 membrane. The thickness of the GC membranes and corresponding GO layer are listed in Table 3. The low GO mass loading and the denser structure of the GO layer (FIG. 2 (d)) render the GO layer ultrathin; for instance, the calculated thickness of GO layer is around 110 nm, which is only 1/175 of the GC1 membrane's thickness.

TABLE 3

Thickness, pore size and surface zeta potential of the GC membranes

| Membrane | GO layer thickness (nm) | Membrane thickness (μm) | Pore size (nm) | | | Surface zeta potential (mV) |
|---|---|---|---|---|---|---|
| CNF | — | 19.3 ± 4.0*** | 9.8$^\alpha$ | 299$^\beta$ | 298$^\gamma$ | −56.3 |
| GC0.5 | 55* | | 5.0$^\alpha$ | 292$^\beta$ | 293$^\gamma$ | −56 |
| GC1 | 110* | | 7.0$^\alpha$ | 287$^\beta$ | 287$^\gamma$ | −56.9 |
| GC2 | 220* | | 7.9$^\alpha$ | 275$^\beta$ | 275$^\gamma$ | |
| GC4 | 440* (390 ± 80**) | | 5.6$^\alpha$ | 274$^\beta$ | 107$^\gamma$ | −54.1 |

Figure 10:
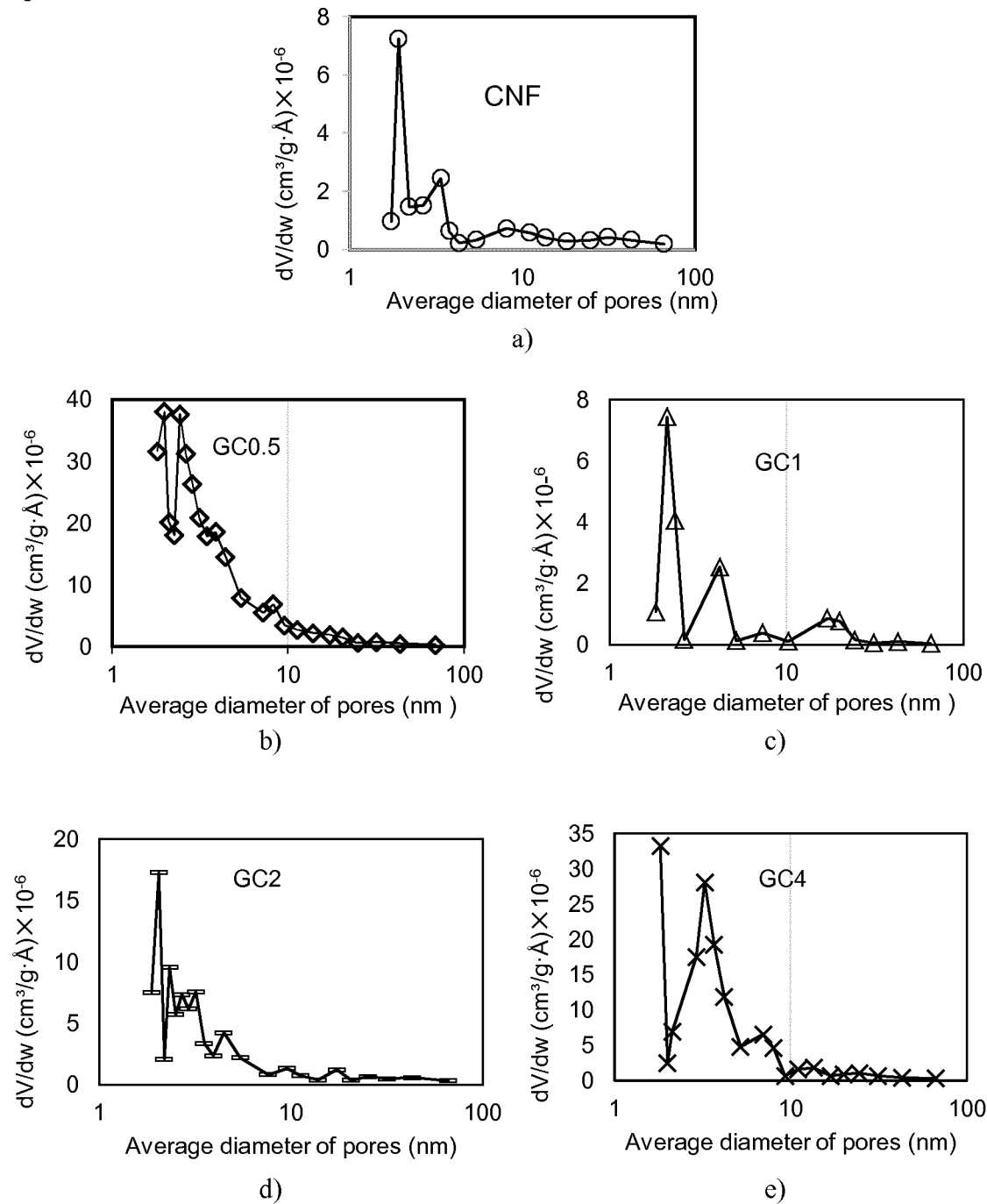
FIG. 10. Distribution of pore size in CNF (a), GC0.5 (b), GC1, (c), GC2 (d), and GC4 (e).

*Calculated thickness values (GO density: 1.91 g/cm³)
**Thickness values measured using SEM.
***Thickness values measured using digital micrometer.
$^\alpha$BJH pore size.
$^\beta$bubble point pore size.
$^\gamma$mean flow pore size from bubble point data Nitrogen adsorption is one of the most widely used porometries in the lab, while both bubble point method and mean flow pore size measurement are very accurate and effective technique for pore size measurement at industrial level. Although it is not meaningful to compare pore sizes of the membranes from different porometry techniques, all three techniques (Table 3) show that the average pore size decreases with the thickness of GO top layer. The results confirm the presence of thin and denser top layer of GO on the CNF layer. The average pore sizes of GC membrane measured by using bubble point method and mean flow pore size measurement are in the range of 0.1 to 0.3 μm, which confirms the micro filtration range of the composite membranes. The wide range distribution of membranes' pore size is detected and presented in FIG. 10, which is attributed to the wide range of diameter distribution of CNF and CNF bundles. It is also well known that in nanocellulose based film or membranes, nanofibrils are packed densely to form a network with pore-dimensions in the range of the diameter of the cellulose nanofibrils and the pore sizes of CNF membranes measured using BET confirms this. [47] Nevertheless, with the current pore size measuring techniques, it is very hard to measure separately the respective pore sizes for the GO barrier layer and CNF layer in the layered membranes. In particular, it is impossible to detach the GO top layer from the composite membrane, when the GO layer is ultra-thin (FIG. 2 (d)).

The surface zeta potentials of the membranes were investigated at pH 7. Table 3 shows that the surface zeta potentials of all the composite membranes remain rather negative ranging from −54 to −56 mV with subtle impact from the GO content. This might due to the very similar zeta potential values of GO and CNF around neutral pH (displayed in FIG. 1 (c)). The negative zeta potentials confirm the negatively charged surface of the GC membranes, which could lead to good fouling resistance by electrostatic repulsion in aqueous solution, since most foulants are also negatively charged. [20, 22]

Figure 3:
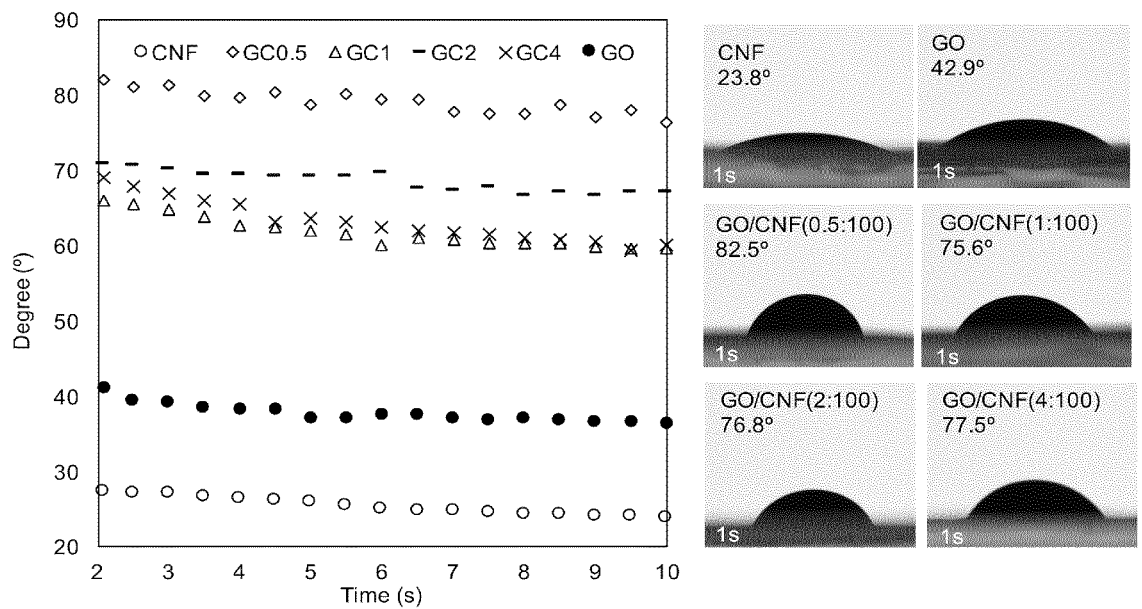
FIG. 3 Contact angle measurement of the composite membranes.
Figure 4:
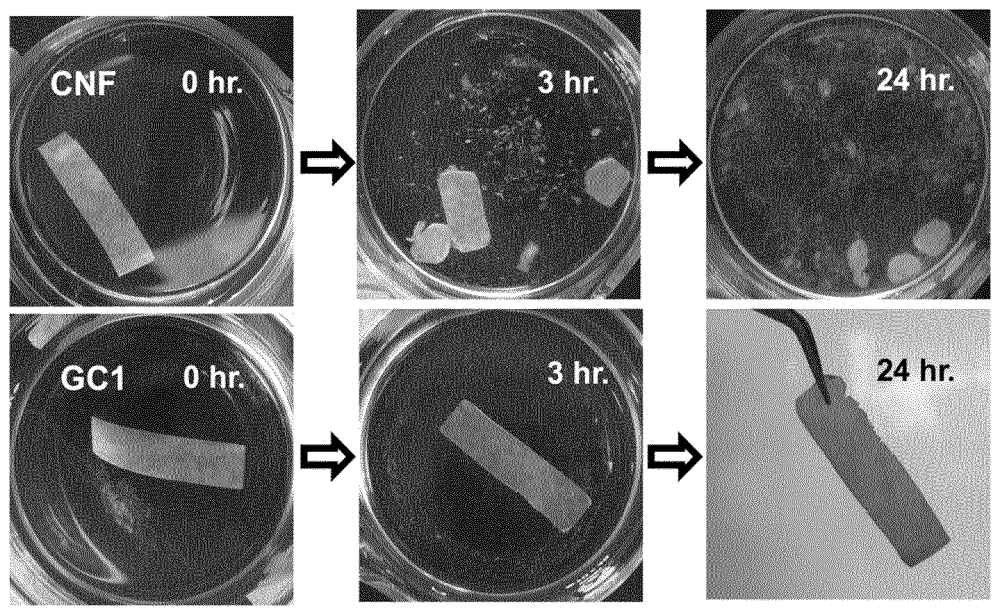
FIG. 4. Photographs of CNF film and GC1 membranes soaked in water under magnetic stirring agitation (250 rpm) for different time intervals.

As displayed in FIG. 3, differing from the hydrophilic nature of CNF film and GO film, the surface contact angles of all the composite membranes with GO ultrathin top layer at 4 certain mass ratios substantially increase to the range between 75° to 83° at the first second. The apparent higher hydrophobic nature of the GC membranes might be largely attributed to the increased surface roughness, such as GO corrugations (GC4) or the presence of "standing inserted GO nanosheets" (GC0.5, GC1, GC2) shown in FIG. 2 (b). The higher hydrophobic nature of the GC membranes can be both beneficial and disadvantageous from the viewpoint of separation membrane application. The increased contact angle can greatly improve the membrane wet structural stability in aqueous conditions (confirmed by the following studies of GC membrane's wet structural stability) by inhibition of swelling and hydration (FIG. 4). Although the increased hydrophobicity leads to a risk of more membrane fouling, especially for bio-fouling; however, its highly negatively charged nature of the GC membrane surface is greatly beneficial to its antifouling property. [17, 48] Since, the formation of membrane fouling is a complex process that affected by many parameters, the GC membrane's antifouling property needs to be further investigated.

Wet Structural Stability and the Mechanical Properties

In water solution, the highly negatively charged GO nanosheets (FIG. 1(c)) tend to repel each other by electrostatic force, ending up with GO film disintegration. Owing to its poor wet stability, neat free-standing GO films prepared by filtration hardly survive the high-pressure cross-flow filtration conditions.[18] Unlike the reported non-crosslinked GO film with its inherent weak structural stability in water solution [18], the GO-CNF membranes displayed excellent structural integrity in water medium. As displayed in FIG. 3, the edges of CNF film started swelling and breaking up very soon after soaking in the water under agitation (250 rpm). At hour 24, The nanofibers that composed of the CNF membrane were completely dispersed in water. Meanwhile, GO membrane maintained an intact structure after soaking in water for 48 hours under the same agitation condition, and could be easily handled with tweezers and reused without any structural damage. The dramatically improved wet structural stability could be also detected by visual observation during the adsorption experiments.

The mechanical properties including modulus, maximum strength and strain of CNF membrane and the double layered GC membranes (GC1, GC4) are listed in Table 4. Table 4 shows that, in room conditions (dry), the double layered GC membranes (GC1 & GC4) have clearly higher modulus and strength in comparison with CNF film. However, the differences of modulus and strength between double layered GC membranes and CNF film become even greater under wet conditions. Compared with wet CNF film, the modulus and the strength of wet GC4 membrane are respectively over 5-fold and 8-fold higher. Considering the low mass ratio of GO in the composite membranes, the GO ultrathin layer dramatically increases the mechanical properties of the GC membranes, especially under wet condition. It is also shown in Table 4 that the mechanical properties increase with GO mass loading on the membrane (GC1&GC4) under both dry and wet conditions.

Figure 5:
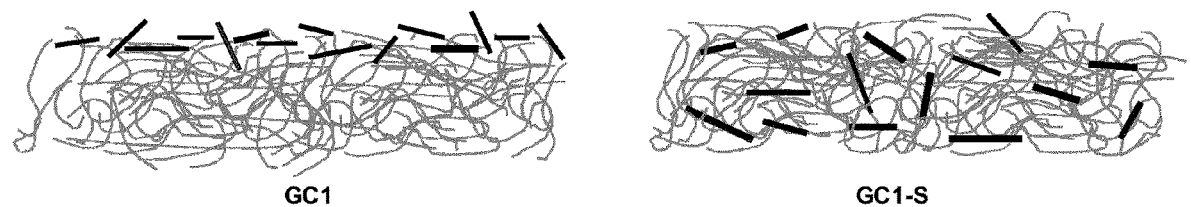
FIG. 5. Schematic of the cross-section structures of GC1 (GO:CNF 1:100, double-layered) and GC1-5 (GO:CNF 1:100, isotropic single-layered).

In order to know the impact of GO-CNF membrane structure to its mechanical properties, the modulus, maximum strength and strain of the isotropic single layered membrane (GC1-5) under both dry and wet conditions were investigated and listed in Table 4. The schematic in FIG. 5 presents the difference of cross-section structure between the double layered membrane (GC1) and the isotropic single layered membrane (GC1-5). Distinguished from the double layered GC membranes, the isotropic single layered GC-S membrane was made up of cellulose nanofibrous matrix incorporating uniformly distributed GO nanosheets. Table 4 shows that the GO-CNF composite membrane structure has a big impact of its mechanical properties. Even with same GO mass loading (GO/CNF=1:100), the double layered GC1 membrane displays much higher strength and modulus than the isotropic single layered GC1-5 membrane under both dried and wet conditions. In fact, even in comparison of GC1-5 and CNF, the addition of 1% GO nanosheets into the isotropic single layered CNF matrix brings almost no impact to its strength enhancement, under both dried and wet conditions.

TABLE 4

Mechanical properties of the membranes in dry, wet and re-dried conditions

| Sample | State | Modulus (MPa) | Modulus increasing$^\alpha$ | Strength (MPa) | Strength increasing$^\beta$ | Strain (%) |
|---|---|---|---|---|---|---|
| CNF | Dry | 2988 ± 307 | — | 50.2 ± 6.3 | — | 4.8 ± 1.3 |
| GC1 | | 3895 ± 842 | +30% | 74.4 ± 2.8 | +48% | 4.8 ± 0.9 |
| GC4 | | 4126 ± 732 | +38% | 80.0 ± 14.9 | +59% | 5.9 ± 2.5 |
| GC1-S | | 3481 ± 620 | +16% | 50.0 ± 11.1 | −0.4% | 3.5 ± 0.5 |
| CNF* | Wet | 171 ± 60 | — | 6.6 ± 4.3 | — | 6.4 ± 2.9 |
| GC1* | | 388 ± 168 | +127% | 27.8 ± 15.1 | +421% | 9.6 ± 0.6 |
| GC4* | | 911 ± 189 | +533% | 55.0 ± 14.0 | +833% | 8.1 ± 0.9 |
| GC1-S* | | 260 ± 96 | +52% | 6.8 ± 3.2 | +3% | 7.5 ± 0.8 |
| CNF** | Re-dried | 2868 ± 215 | — | 49.4 ± 8.3 | — | 6.3 ± 1.4 |
| GC1** | | 3395 ± 966 | +18% | 62.0 ± 6.9 | +26% | 5.2 ± 0.6 |

*wet samples prepared by soaking in water 1 hours before testing;
**re-dried samples prepared by drying the wet samples at 22° C. for 24 hours;
$^\alpha$Modulus increasing ratio (%) of the GC membranes compared with CNF membrane at the same condition.
$^\beta$Strength increasing ratio (%) of the GC membranes compared with CNF membrane at the same condition Although the modulus and strength were lower compared with the dry membranes, the re-dried samples still have reasonably good mechanical properties. Besides, the re-dried membranes exhibit higher strain than the corresponding dried membranes. The mechanical properties of re-dried GC membrane suggest that the membranes can be reused without significant loss of modulus and strength.

The excellent structural stability and dramatically improved mechanical properties of GC double layered membranes under both dry and wet conditions indicate the strong interactions between adjacent GO nanosheets and strong interactions between GO and CNF, which contributed to the hydrogen bonds formation between the oxygen containing groups on GO nanosheets and the hydroxyl groups on CNF [41, 42]. In the meantime, the increased hydrophobic nature of GC membranes (shown in FIG. 4) strengthened their structural stability in aqueous conditions by inhibition of swelling and hydration.

Water Permeability

Figure 6:
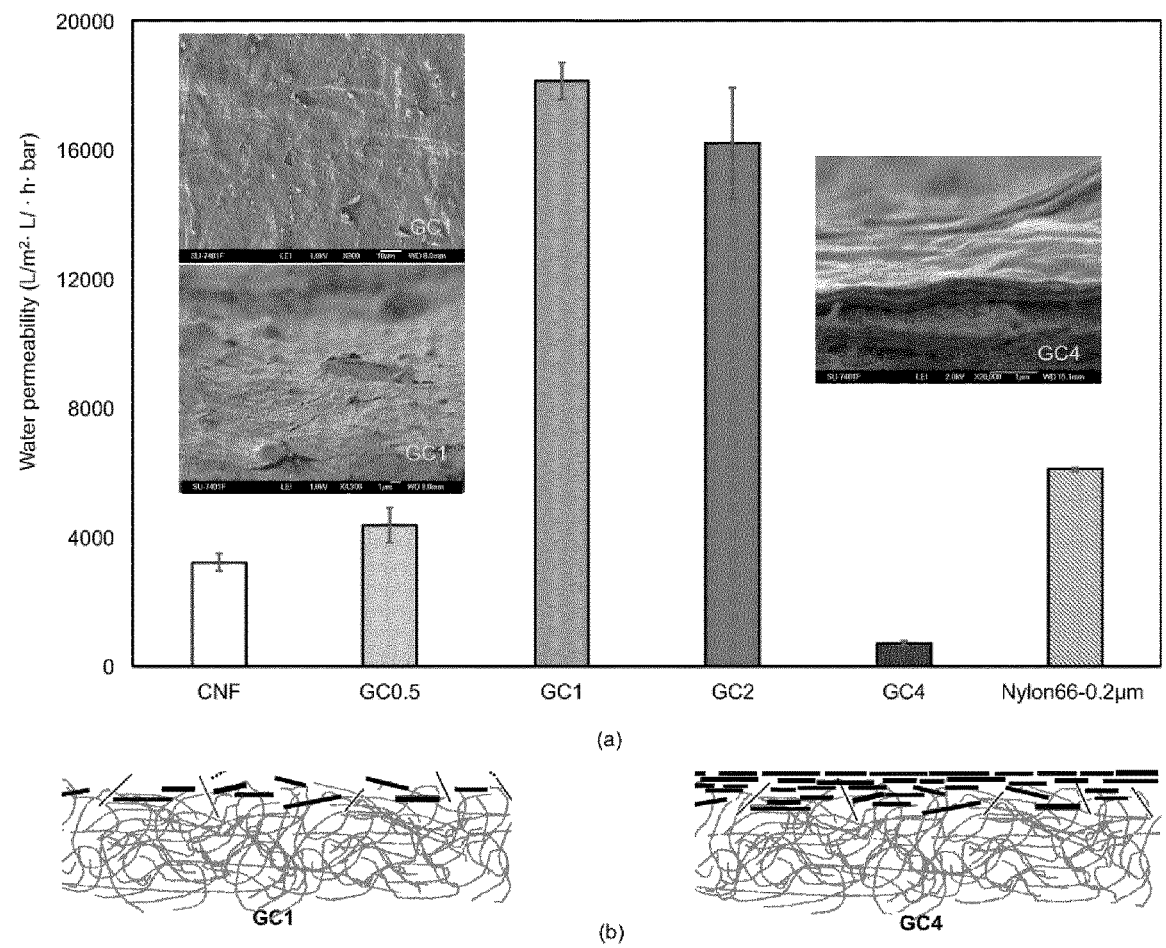
FIG. 6. (a) Water permeability and the SEM images showing the "standing inserted GO sheets" structure of GC1 and the dense GO laminates of GC4 (GO:CNF 4:100, double-layered). (b) Schematic showing the cross-section structures of GC1 and GC4 composite membranes.

As shown in FIG. 6 (a), CNF film has a rather good water permeability of 3229 L/m$^2$·L/··h·bar, which can be explained based on wide distribution of diameters (from 5 nm to over 100 nanometers displayed in FIG. 1. (b)) and a relatively large fraction of coarser nanofibers forming larger pores in the network. However, after covering with GO ultrathin denser layer on the cellulose nanofibrous layer, the water permeability of the membranes GC0.5, GC1 and GO2, unexpectedly, increased remarkably. The water permeability surged to 18123 L/m$^2$·L/m$^2$·h·bar (increase by 561% compared to the CNF film) of the GC membrane when the mass ratio of GO to CNF is 1:100 (GO thickness: 110 nm). Covering 1 wt. % GO ultrathin layer makes the water permeability of GC1 membrane over 5-fold higher than the CNF nanofibrous support and 3-fold higher than the commercial membrane (Nylon66-0.2 µm) with same pore size range. The ultra-fast water permeation flux is believed being attributed to both low water flow friction through GO nanosheets [49] and the remarkable structures of "standing inserted GO sheets" of membrane surface displayed in FIG. 6 (a). The GO sheets that were inserted perpendicularly into the CNF nanofibrous layer may create spacing at the interface of the inserted sheets with cellulose nanofibers. The spacing surrounding the nanosheets at the interface with the nanofibrous layer act as perpendicular "nanochannels" for ultrafast transport of water through the membranes (as GC1 cross-section structure displayed in FIG. 6 (b).

However, when the mass ratio of GO to CNF rises up to 4:100 (GO calculated thickness: 440 nm), the composite membrane (GC4) has the lowest water permeability (723 L/m$^2$·L·/·h·bar) among all the tested membranes. The thickness of the GO layer on top of GC4 membrane detected using SEM varies from 0.2 µm to 0.5 µm owing to the wrinkled GO surface. Higher mass loading of GO sheets render the formation of dense GO laminates (FIG. 6 (a)) that completely cover the CNF nanofibrous layer and shield the "nanochannels" for water delivery as schematically displayed in FIG. 6 (b). In consistent with the top-view SEM images shown in FIG. 2, the structure of "standing inserted GO sheets" is rarely observed on the surface of GC4, while the same structure is easily detected on the surface of GC0.5, GC1 and GC2.

It is noteworthy that although membrane GC4 has the poorest water permeability among the composite membranes due to thicker layer of GO laminates, the membrane still has considerably higher water permeability than the pure GO film prepared by vacuum filtration. Qiu et al. first reported that the water permeability of the thermally corrugated GO membranes is 45 Lm$^{-2}$·L$^{-1}$·h·bar. [50] It was also reported that the water permeability of 0.15 µm thick vacuum filtration prepared GO film is 71 Lm$^{-2}$·L$^{-1}$·h·bar, which is only 1/10 of GC4's permeability. [13] And when the thickness of vacuum filtration prepared GO film increases to 0.4 µm, the water permeability drops below 5 Lm$^{-2}$·L$^{-1}$·h·bar.[13] The huge difference of permeability compared with the previous studies indicates that the structure of the top GO layer in GC4 is substantially influenced by the cellulose nanofiber networks below, which makes the GO barrier layer differing from the GO nanosheets structures in pure GO film. Compared with pure GO film, the GO top layer is supposed to have larger interspacing between the sheets under the influence of nanofibrous support as displayed in the SEM image (FIG. 6(b)).

Dye Retention Performance

Figure 7:
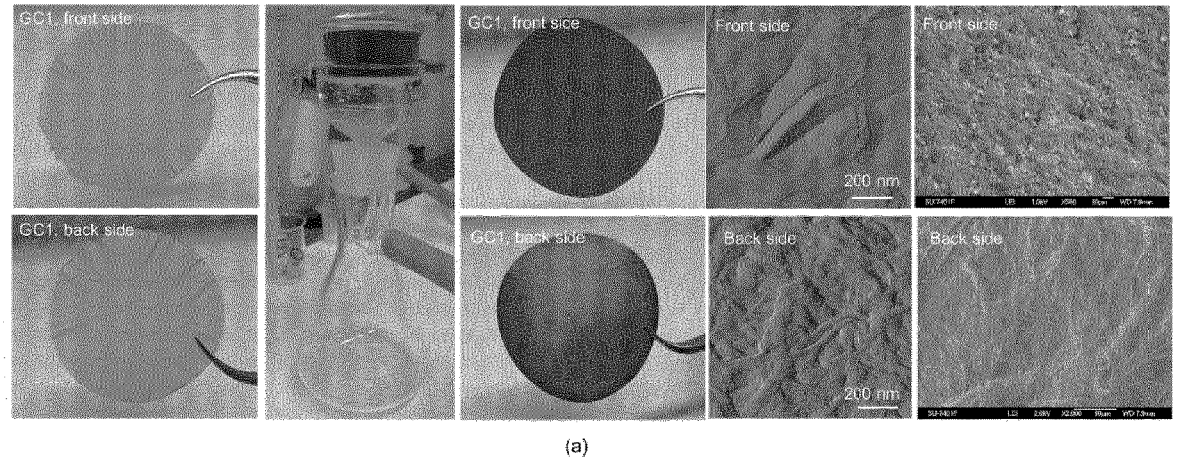
FIG. 7. Filtration performance. (a) surface morphologies of the both sides for GC1 membrane after dye filtration. (b) Retention of the membranes for the dye molecules. (c) Retention performance of GC1 membrane, as a function of hydrated radius for the probe dye molecules with different charges. *The hydrated radius of rhodamine 6G (R6G) is known from literature [51, 52] and the hydrated radius of Victoria Blue B (VBB) and Methyl Violet 2B (MV2) is measured by using Zetasizer (detailed information in Table 5); The zeta potential of the dye molecules is detected by zetasizer (detailed information in Table 5). (d) Schematic of the cross sections for the membrane of GC1 and GC1-5 and their corresponding dye solution filtrates.
Figure 7:
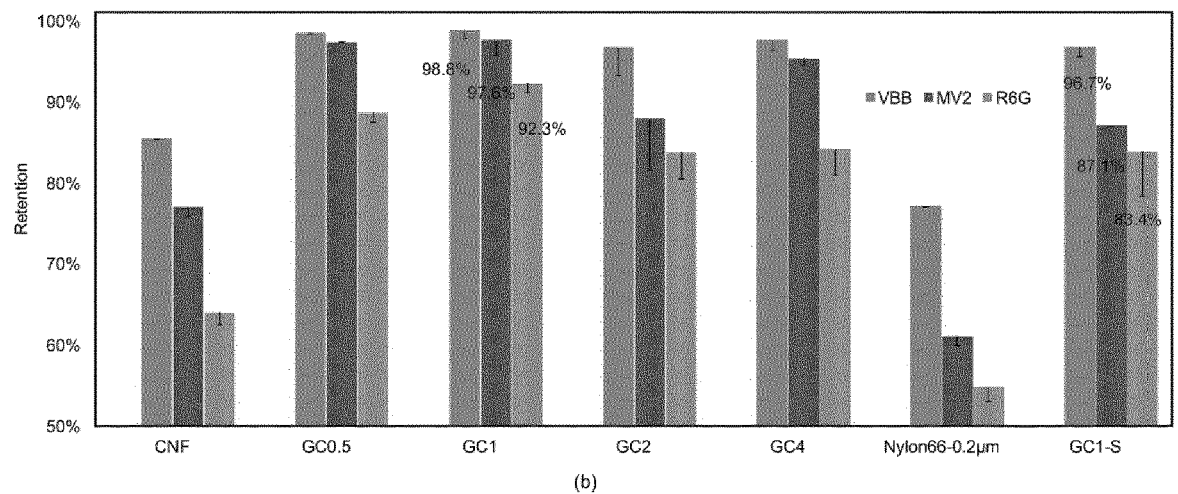
Figure 7:
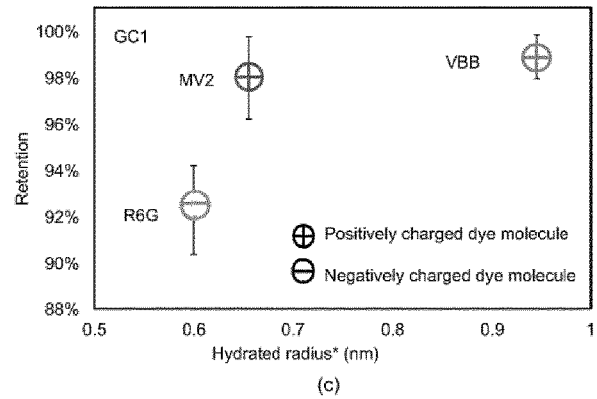
Figure 7:
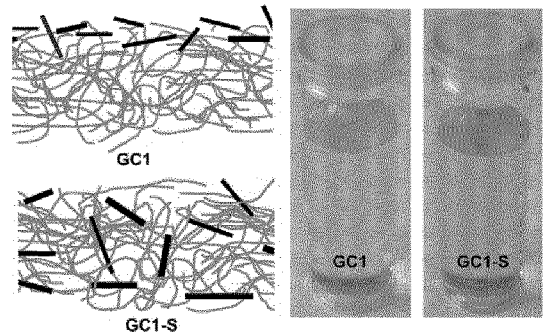

The membranes were tested for their retention performance of dye molecules using the vacuum filtration apparatus under a constant vacuum pressure of 0.9 bar (FIG. 7 (a)). The feed solution (pH=7.17, 30 ml) was a dye mixture solution containing Victoria blue B (VBB, positively charged), methyl violet 2B (MV2, positively charged) and rhodamine 6G (R6G, negatively charged) with a concentration of 2 mg/L for each. As displayed in FIG. 7(a), no color could be detected by visual observation for the dye solution permeate through the GC1 membrane during filtration experiment. The SEM and AFM images in FIG. 7 (a) show the front side of GC1 membrane after filtration experiment that is completely shielded by dye molecules and no original membrane morphology could be detected. On the other hand, the back side of GC1 membrane after dye filtration remained rather intact and the original fiber networks can be clearly observed.

FIG. 7 (b) presents the retention performance of the membranes for the three dye molecules and FIG. 7 (c) displays the dye retention ratios of GC1 membrane as a function of hydrated radius for the probe dye molecules with different charge nature. The charge nature and hydrated radius of the dyes shown in FIG. 7 (c). were confirmed using zeta sizer at pH around 7 (data listed in Table 5).

TABLE 5

Zeta potential and hydrated size of RG6, MV2 and VBB dye probe molecules

| Dyes | Conc. (mg/L) | pH | Zeta-potential (mV) | Hydrodynamic diameter ratio of the dyes* | Hydrated radius (nm)** |
|---|---|---|---|---|---|
| R6G | 2 | 7.02 | −36.9 ± 5.6 | 1 | 0.6 [55, 56] |
| MV2 | 2 | 7.6 | 5.2 ± 0.2 | 1.092 | 0.65 |
| VBB | 2 | 6.9 | 20.8 ± 1.6 | 1.574 | 0.94 |

*Hydrodynamic diameter ratio of the dyes was detected by using zetasizer at the same conditions.
**The hydrated radius of R6G is known from the literature. The hydrated radius of MV2 and VBB was calculated based on the hydrodynamic diameter ratio between R6G and the other two dyes.

As shown in FIG. 7 (b), all the membranes share the same order of dye retention efficiency among the three charged ones (VBB(+)>MV2(+)>R6G(−)), which coincide their hydrated radius order (VBB(0.94 nm)>MV2(0.65 nm)>R6G (0.60 nm) [51, 52]. Higher hydrated radius leads to higher retention for the probe dye molecule, which indicates the significance of size exclusion effect in the process of GC membrane filtration. On the other the hydrated radius difference between the positively charged MV2 (0.65 nm) and negatively charged R6G (0.6 nm) is relatively small, however, their corresponding retention efficiency difference could be rather disproportionally bigger (FIG. 7. (b)). This might be attributed to the charge difference between the dyes. As displayed previously in both FIG. 1 (c) and Table 2, all the fabricated membranes exhibited negatively charged surface, which might end up with stronger tendency for capturing the positively charged dye molecules through electrostatic interaction. More discussions about charge nature for the dye molecules and its effect on adsorption behaviour of the membranes are presented in the following part of dye adsorption.

CNF film showed higher retention of the dyes compared with the commercial nylon 66-0.2 μm membrane, having similar pore sizes. However, the ultrathin GO barrier layer topped on the cellulose nanofibrous layer remarkably increased the dye retention efficiencies of membranes at all four mass ratios of GO to CNF as displayed in FIG. 7 (b); this can be also easily observed visually. Unexpectedly the dye rejection ratio of the GC membranes does not increase with the thickness of GO barrier layer. As displayed in FIG. 7(b), the optimal removal of dye molecules happened when the mass ratio of GO to CNF is 1:100. Membrane GCrs dye retentions of VBB, MV2 and R6G are 98.8%, 97.6% and 92.3% respectively, which are much higher than CNF film and the commercial nylon 66-0.2 μm membrane.

Isotropic single layered GC-S membrane (FIG. 7 (d)) was fabricated by using vacuum filtration of the mixed suspension of GO and CNF at the mass ratio of 1 to 100 (GC1-S). Compared with CNF film, the dye rejection rates of GC1-S are also substantially improved owing to the 1 wt. % addition of GO nanosheets. On the other hand, even with the same GO loading in the membranes, the double layered GC1 membrane has higher rejection rates to all the three dyes than isotropic single layered GC1-S membrane, especially for the dye molecules of MV2 and R6G as displayed in FIG. 7 (b). The total dye retention of GC1 membrane is 96.4%, while the total dye retention of GC1-S is 89.0% (FIG. 7(d)). As displayed in FIG. 7 (d), the permeate solution through GC-1 membrane is observed less colored than the filtrate from GC-1S membrane.

It is worth to mention that the current studies of dye retentions through layered GC membrane topped with ultrathin GO barrier strongly argue against some previous studies. Akbari et al. reported that pristine negatively charged GO film has even higher efficiency to block negatively charged dye molecules compared with positively charged ones owing to electrostatic repulsion.[13] Gao et al. reported that the rejection of negatively charged dye molecules using GO film was slightly higher than the positively charged ones. [19]

Figure 8:
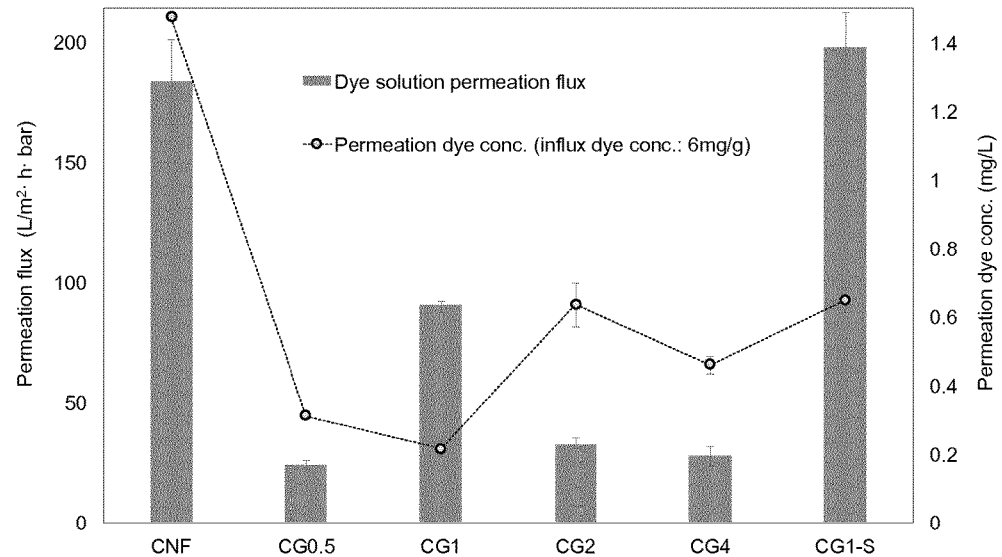
FIG. 8. Dye total concentration in the permeate solution for all the membranes and the corresponding dye solution flux.

FIG. 8 displays the dye concentration in the permeate solution and the corresponding dye solution flux for all the membranes. As presented in FIG. 8, the dye concentration of permeate solution through membrane CG1 is 0.22 mg/g (influx dye conc.:6 mg/g), which is only one seventh of the dye concentration of permeate solution through pristine CNF film and one third of that through membrane isotropic single layered GC1-5 (0.65 mg/g). The higher dye solution flux of CNF film compared to other GC membranes is due to its relatively lower retention of dye molecules rendering less restricted passage of water molecules. Besides, among all the layered GC membranes, GC1 exhibits not only the best dye separation performance with the separation efficiency of 521 mg m$^{-2}$ h$^{-1}$ bar$^{-1}$ (displayed in FIG. 7 (b)), but also the highest dye solution flux, which was more than double compared to all the other layered GC membranes (GC0.5, GC2 & GC4). Therefore, the construction of the GC1 membrane is the optimal one among the layered GC membranes for water permeability, dye retention and dye solution permeability. Nevertheless, the dye solution flux through membrane GC1-5 is even higher than the solution flux of CNF film and 2-fold higher than that of GC1 (FIG. 8). The higher dye solution permeability of GC1-5 might be attributed to the higher amount of water nanochannels created by the interface spacing between the nanofiber matrix and the evenly dispersed GO nanosheets through the membranes. [19] The study shows that the ultrathin barrier layer composed of stacked interconnected GO sheets has a better separation of dye molecules and higher water migration through the membrane than the GO nanosheets dispersed evenly in the nanofibrous matrix.

Adsorption behavior of the membranes for the dye molecules

In order to clarify the effect of adsorption in the process of filtration, CNF film and GC1 membrane adsorption testing as a function of time were conducted with the same dye stock solution (dye conc.: 3×2 mg/L, 30 ml, pH=7.17) used in filtration testing.

Figure 9:
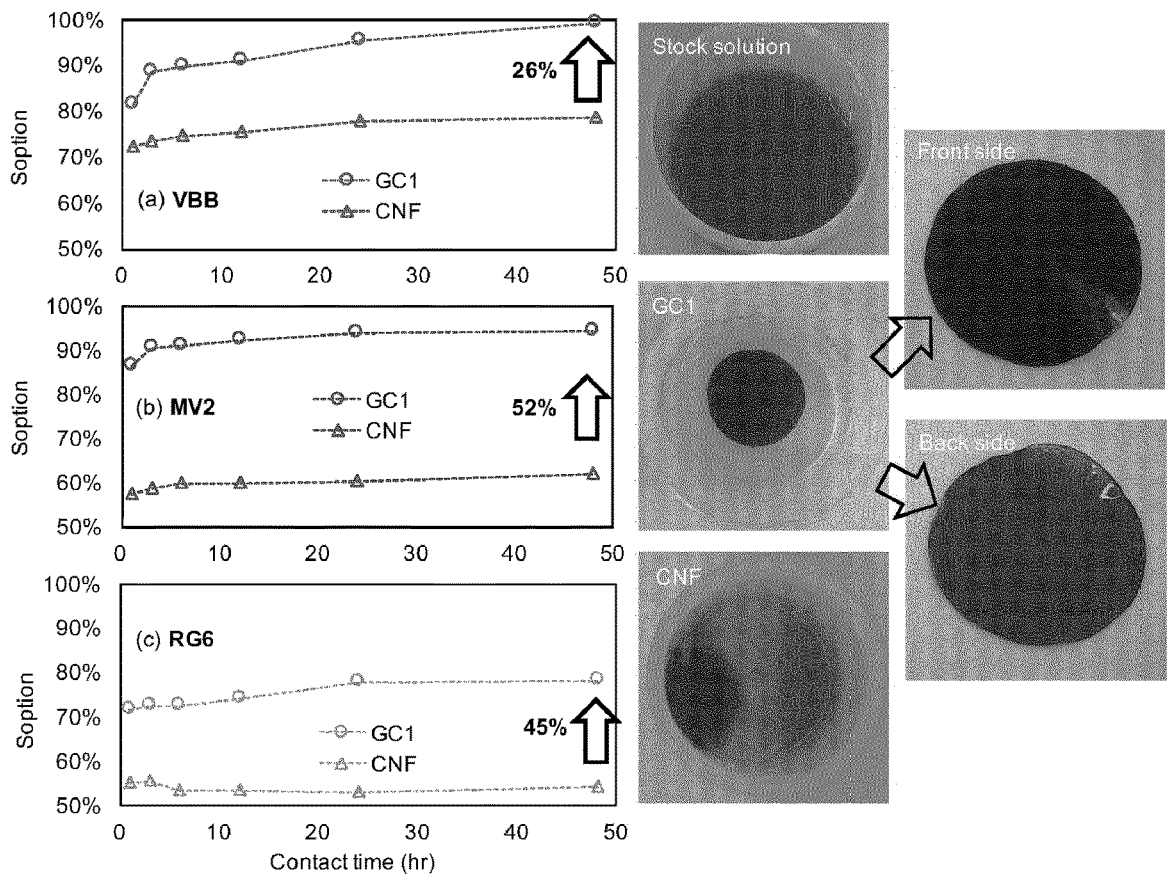
FIG. 9. Adsorption behaviour of CNF and GC1 membranes for the dye molecules as a function of time.

As displayed in FIG. 9, dye adsorption happens quickly for both CNF and GC membranes. Over 50% of the dyes are removed by adsorption onto the membranes within the first hour and the dye removal ratios went up continuously and mildly up to hour 48. Both membranes exhibit the same adsorption preference among the dyes (VBB(+)>MV2(+) >R6G (−)) same as the order of their retention efficiencies.

As displayed in FIG. 9 (a), 81.2% of VBB was adsorbed onto GC membrane at the first hour and 99.1% of VBB was removed from solution at hour 48. As presented in FIG. 9 and Table 6, only 1 wt. % addition of GO topped on the CNF layer substantially improves its dye adsorption capacity. Compared with CNF film, the adsorption of VBB (+), MV2 (+) and R6G (−) onto GC1 membrane at hour 48 increases by 28%, 52% and 45% respectively. The big dye adsorption improvement between the membranes can be easily detected by visual observation as presented in FIG. 9. In the meantime, GC1 membrane displayed robust wet structural stability during adsorption testing. If the CNF film and the CNF layer in GC membrane were assumed having the same dye adsorption capacity, then the calculated adsorption capacity of the added 1 wt. % GO is super high that could reach 230 mg/g (adsorbed dye/GO). The super high dye adsorption capacity of GO ultrathin layer might be attributed to its high charge content, which is 20-fold higher the charge content of CNF (FIG. 1c).

TABLE 6 dye adsorption amount of CNF film and GC1 membranes at contact time: 48 hr.

| Membranes | Dye adsorption capacity (mg/g) | | | |
| --- | --- | --- | --- | --- |
| | VBB | MV2 | RG6 | Total |
| CNF | 2.4 | 1.8 | 1.6 | 5.8 |
| GC1 | 3.0 (60) | 2.8 (100) | 2.3 (70) | 8.1 (230) |

Dye Adsorption Capacity with Respect to GO Given in Brackets

The adsorption studies of dye molecules suggest that adsorption played an important role in the GC membrane's removal of dyes during filtration. High dye rejection rates of GC membranes are closely related to GO's high adsorption capacity of dyes. The current studies strongly argue against several previous statements, which claims that adsorption has little effect on dye rejection rates for both GO film and GO composite membranes.[13, 17, 19]

Although the negatively charged GC membrane shows an adsorption preference towards positively charged dyes (VBB, MV2), the membrane exhibits quite good capacity for the capture of negatively charged dyes. In other words, the interactions between GC membrane and the adsorbed dye molecules were not only confined to electrostatic interaction. Retention mechanism of dye molecules through GC membranes is a close combination of both adsorption and molecular size sieving, since higher percentage of dyes was removed at shorter time during cross-flow filtration compared with membrane adsorption. During the permeation of dye solution through the membranes, the molecules are likely being initially captured by adsorption through electrostatic attraction and coordination, whereas the coordinated dye molecules with GO composite membranes restrict and block the passage of the molecules. [53]

CONCLUSIONS

In conclusion, it has been successfully demonstrated that ultrathin GO barrier layer could be sturdily constructed onto cellulose nanofibrous layer by two sequential vacuum filtrations of CNF suspension and GO nanosheets solution with no assistance of any chemical crosslinker. The increasing membrane surface hydrophobic nature, as well as the strong interactions between GO nanosheets and cellulose nanofibers, lead to the strong structural stability and the excellent flexibility of the GC membranes under all dried, wet and re-dried conditions. The membrane with optimized GO layer thickness exhibit extremely high-water permeation (18123±574 $Lm^{-2}$ $h^{-1}$ $bar^{-1}$) and great separation performance (dye rejection: 92.3% to 98.8%; dye separation efficiency: 521 mg $m^{-2}$ $h^{-1}$ $bar^{-1}$) of dye probe molecules with different charge nature, which were believed closely related to its unique structure of the "standing inserted GO nanosheets" on the membrane surface. It is also demonstrated the double layered GC membrane outperforms the corresponding isotropic single layered membrane construction with regard to mechanical properties and dye retention performance. The GC membrane itself possessed also strong adsorption capacity towards the both positively and negatively charged dye molecules and its excellent separation of dye molecules in filtration was attributed to both adsorption and molecular size exclusion. Consequently, the remarkably high flux, good structural stability, high rejection rate and easy method of fabrication rendered the GC membranes a strong competitor in many membrane separation fields such as water purification (e.g. decolourization of dye wastewater, pesticide and bacteria filtration), food industry (e.g. concentration and recovery of milk, separation of brewage microorganisms) and biomedicine (e.g. urine dialysis membrane). [17, 54]

REFERENCES

1. L. He, L. F. Dumée, C. Feng, L. Velleman, R. Reis, F. She, W. Gao, L. Kong, Promoted water transport across graphene oxide-poly(amide) thin film composite membranes and their antibacterial activity, Desalination 365 (2015) 126-135.
2. X. Zhang, T. Zhang, J. Ng, D. D. Sun, High-performance multifunctional TiO2 nanowire ultrafiltration membrane with a hierarchical layer structure for water treatment, Adv. Funct. Mater. 19 (2009) 3731-3736.
3. Y. Han, Z. Xu, C. Gao, Ultrathin graphene nanofiltration membrane for water purification, Adv. Funct. Mater. 23 (2013) 3693-3700.
4. X. Peng, J. Jin, Y. Nakamura, T. Ohno, I. Ichinose, Ultrafast permeation of water through protein-based membranes, Nat. Nanotechnol. 4 (2009) 353-357.
5. R. Van Reis, A. Zydney, Membrane separations in biotechnology, Curr. Opin. Biotechnol. 12 (2001) 208-211.
6. H. Huang, Y. Ying, X. Peng, Graphene oxide nanosheet: An emerging star material for novel separation membranes, J. Mater. Chem. A 2 (2014) 13772-13782.
7. R. K. Joshi, P. Carbone, F. C. Wang, V. G. Kravets, Y. Su, I. V. Grigorieva, H. A. Wu, A. K. Geim, R. R. Nair, Precise and ultrafast molecular sieving through graphene oxide membranes, Science 343 (2014) 752-754.
8. L. Yan, Y. S. Li, C. B. Xiang, Preparation of poly (vinylidene fluoride)(pvdf) ultrafiltration membrane modified by nano-sized alumina ($Al_2O_3$) and its antifouling research, Polymer 46 (2005) 7701-7706.
9. Z. Xu, F. Alsalhy Qusay, Polyethersulfone (PES) hollow fiber ultrafiltration membranes prepared by PES/non-solvent/NMP solution, J. Membr. Sci. 233 (2004) 101-111.
10. B. Van der Bruggen, M. Mänttäri, M. Nystrom, Drawbacks of applying nanofiltration and how to avoid them: A review, Separation and Purification Technology 63 (2008) 251-263.
11. B. Van Der Bruggen, C. Vandecasteele, T. Van Gestel, W. Doyen, R. Leysen, A review of pressure-driven membrane processes in wastewater treatment and drinking water production, Environ. Prog. 22 (2003) 46-56.
12. S. Kim, X. Lin, R. Ou, H. Liu, X. Zhang, G. P. Simon, C. D. Easton, H. Wang, Highly crosslinked, chlorine tolerant polymer network entwined graphene oxide membrane for water desalination, J. Mater. Chem. A 5 (2017) 1533-1540.
13. A. Akbari, P. Sheath, S. T. Martin, D. B. Shinde, M. Shaibani, P. C. Banerjee, R. Tkacz, D. Bhattacharyya, M. Majumder, Large-area graphene-based nanofiltration membranes by shear alignment of discotic nematic liquid crystals of graphene oxide, Nat. Commun. 7 (2016).
14. P. Sun, M. Zhu, K. Wang, M. Zhong, J. Wei, D. Wu, Z. Xu, H. Zhu, Selective ion penetration of graphene oxide membranes, ACS Nano 7 (2013) 428-437.
15. P. K. S. Mural, S. Jain, S. Kumar, G. Madras, S. Bose, Unimpeded permeation of water through biocidal graphene oxide sheets anchored on to 3D porous polyolefinic membranes, Nanoscale 8 (2016) 8048-8057.
16. O. C. Compton, S. W. Cranford, K. W. Putz, Z. An, L. C. Brinson, M. J. Buehler, S. T. Nguyen, Tuning the mechanical properties of graphene oxide paper and its associated polymer nanocomposites by controlling cooperative intersheet hydrogen bonding, ACS Nano 6 (2012) 2008-2019.
17. Q. Fang, X. Zhou, W. Deng, Z. Zheng, Z. Liu, Free-standing bacterial cellulose-graphene oxide composite membranes with high mechanical strength for selective ion permeation, Sci. Rep. 6 (2016).
18. C. Yeh, K. Raidongia, J. Shao, Q.-. Yang, J. Huang, On the origin of the stability of graphene oxide membranes in water, Nat. Chem. 7 (2015) 166-170.
19. S. J. Gao, H. Qin, P. Liu, J. Jin, SWCNT-intercalated GO ultrathin films for ultrafast separation of molecules, J. Mater. Chem. A 3 (2015) 6649-6654.
20. C. Zhang, K. Wei, W. Zhang, Y. Bai, Y. Sun, J. Gu, Graphene Oxide Quantum Dots Incorporated into a Thin Film Nanocomposite Membrane with High Flux and Antifouling Properties for Low-Pressure Nanofiltration, ACS Appl. Mater. Interfaces 9 (2017) 11082-11094.
21. C. Cheng, L. Shen, X. Yu, Y. Yang, X. Li, X. Wang, Robust construction of a graphene oxide barrier layer on a nanofibrous substrate assisted by the flexible poly (vinylalcohol) for efficient pervaporation desalination, J. Mater. Chem. A 5 (2017) 3558-3568.
22. S. Bano, A. Mahmood, S.-. Kim, K.-. Lee, Graphene oxide modified polyamide nanofiltration membrane with improved flux and antifouling properties, J. Mater. Chem. A 3 (2015) 2065-2071.
23. J. Zhu, J. Wang, J. Hou, Y. Zhang, J. Liu, B. Van der Bruggen, Graphene-based antimicrobial polymeric membranes: a review, J. Mater. Chem. A 5 (2017) 6776-6793.
24. S. Park, K.-. Lee, G. Bozoklu, W. Cai, S. B. T. Nguyen, R. S. Ruoff, Graphene oxide papers modified by divalent ions—Enhancing mechanical properties via chemical cross-linking, ACS Nano 2 (2008) 572-578.
25. S. Park, D. A. Dikin, S. T. Nguyen, R. S. Ruoff, Graphene oxide sheets chemically cross-linked by polyallylamine, J. Phys. Chem. C 113 (2009) 15801-15804.
26. M. Hu, B. Mi, Enabling graphene oxide nanosheets as water separation membranes, Environ. Sci. Technol. 47 (2013) 3715-3723.
27. M. Jonoobi, A. P. Mathew, K. Oksman, Producing low-cost cellulose nanofiber from sludge as new source of raw materials, Industrial Crops and Products 40 (2012) 232-238.
28. Z. Karim, A. P. Mathew, M. Grahn, J. Mouzon, K. Oksman, Nanoporous membranes with cellulose nanocrystals as functional entity in chitosan: Removal of dyes from water, Carbohydr. Polym. 112 (2014) 668-676.
29. Z. Karim, A. P. Mathew, V. Kokol, J. Wei, M. Grahn, High-flux affinity membranes based on cellulose nanocomposites for removal of heavy metal ions from industrial effluents, RSC Adv. 6 (2016) 20644-20653.
30. P. Liu, K. Oksman, A. P. Mathew, Surface adsorption and self-assembly of Cu(II) ions on TEMPO-oxidized cellulose nanofibers in aqueous media, J. Colloid Interface Sci. 464 (2016) 175-182.
31. P. Liu, P. F. Borrell, M. Božič, V. Kokol, K. Oksman, A. P. Mathew, Nanocelluloses and their phosphorylated derivatives for selective adsorption of $Ag+$, $Cu2+$ and $Fe3+$ from industrial effluents, J. Hazard. Mater. 294 (2015) 177-185.
32. A. P. Mathew, K. Oksman, M. Sain, The effect of morphology and chemical characteristics of cellulose reinforcements on the crystallinity of polylactic acid, J Appl Polym Sci 101 (2006) 300-310.
33. H. Voisin, L. Bergström. P. Liu, A. P. Mathew, Nano-cellulose-Based Materials for Water Purification, Nanomaterials 7(3), (2017) 57-69.
34. A. F. Turbak, F. W. Snyder, K. R. Sandberg, Microfibrillated cellulose, a new cellulose product: properties, uses, and commercial potential, J. Appl. Polym. Sci.: Appl. Polym. Symp. 37 (1983) 815-827.
35. A. P. Mathew, K. Oksman, Z. Karim, P. Liu, S. A. Khan, N. Naseri, Process scale up and characterization of wood cellulose nanocrystals hydrolysed using bioethanol pilot plant, Industrial Crops and Products 58 (2014) 212-219.
36. T. Saito, S. Kimura, Y. Nishiyama, A. Isogai, Cellulose nanofibers prepared by TEMPO-mediated oxidation of native cellulose, Biomacromolecules 8 (2007) 2485-2491.
37. Z. Karim, S. Claudpierre, M. Grahn, K. Oksman, A. P. Mathew, Nanocellulose based functional membranes for water cleaning: Tailoring of mechanical properties, porosity and metal ion capture, J. Membr. Sci. 514 (2016) 418-428.
38. P. Liu, H. Sehaqui, P. Tingaut, A. Wichser, K. Oksman, A. P. Mathew, Cellulose and chitin nanomaterials for capturing silver ions ($Ag+$) from water via surface adsorption, Cellulose 21 (2014) 449-461.
39. H. Voisin, L. Bergstrom, P. Liu, A. P. Mathew, Nano-cellulose-based materials for water purification, Nanomaterials 7 (2017).
40. S. Iwamoto, W. Kai, A. Isogai, T. Iwata, Elastic modulus of single cellulose microfibrils from tunicate measured by atomic force microscopy, Biomacromolecules 10 (2009) 2571-2576.
41. P. T. Yasir Beeran, V. Bobnar, S. Gorgieva, Y. Grohens, M. Finšgar, S. Thomas, V. Kokol, Mechanically strong, flexible and thermally stable graphene oxide/nanocellulosic films with enhanced dielectric properties, RSC Adv. 6 (2016) 49138-49149.
42. M. S. Sajab, C. H. Chia, C. H. Chan, S. Zakaria, H. Kaco, S. W. Chook, S. X. Chin, A. M. Noor, Bifunctional graphene oxide-cellulose nanofibril aerogel loaded with Fe(iii) for the removal of cationic dye via simultaneous adsorption and Fenton oxidation, RSC Adv. 6 (2016) 19819-19825.
43. C. Zhu, P. Liu, A. P. Mathew, Self-Assembled TEMPO Cellulose Nanofibers: Graphene Oxide-Based Biohybrids for Water Purification, ACS Applied Materials and Interfaces 9 (2017) 21048-21058.

44. R. Xiong, K. Hu, A. M. Grant, R. Ma, W. Xu, C. Lu, X. Zhang, V. V. Tsukruk, Ultra robust Transparent Cellulose Nanocrystal-Graphene Membranes with High Electrical Conductivity, Adv Mater 28 (2016) 1501-1509.
45. Y. Fan, T. Saito, A. Isogai, TEMPO-mediated oxidation of β-chitin to prepare individual nanofibrils, Carbohydrate Polymers 77 (2009) 832-838.
46. H. Sehaqui, U. P. de Larraya, P. Liu, N. Pfenninger, A. P. Mathew, T. Zimmermann, P. Tingaut, Enhancing adsorption of heavy metal ions onto biobased nanofibers from waste pulp residues for application in wastewater treatment, Cellulose 21 (2014) 2831-2844.
47. A. Mautner, K.-. Lee, P. Lahtinen, M. Hakalahti, T. Tammelin, K. Li, A. Bismarck, Nanopapers for organic solvent nanofiltration, Chem. Commun. 50 (2014) 5778-5781.
48. E. M. Vrijenhoek, S. Hong, M. Elimelech, Influence of membrane surface properties on initial rate of colloidal fouling of reverse osmosis and nanofiltration membranes, J. Membr. Sci. 188 (2001) 115-128.
49. R. R. Nair, H. A. Wu, P. N. Jayaram, I. V. Grigorieva, A. K. Geim, Unimpeded permeation of water through helium-leak-tight graphene-based membranes, Science 335 (2012) 442-444.
50. L. Qiu, X. Zhang, W. Yang, Y. Wang, G. P. Simon, D. Li, Controllable corrugation of chemically converted graphene sheets in water and potential application for nanofiltration, Chem. Commun. 47 (2011) 5810-5812.
51. I. I. Vlasov, A. A. Shiryaev, T. Rendler, S. Steinert, S.-. Lee, D. Antonov, M. Voros, F. Jelezko, A. V. Fisenko, L. F. Semjonova, J. Biskupek, U. Kaiser, O. I. Lebedev, I. Sildos, P. R. Hemmer, V. I. Konov, A. Gali, J. Wrachtrup, Molecular-sized fluorescent nanodiamonds, Nat. Nanotechnol. 9 (2014) 54-58.
52. P.-. Gendron, F. Avaltroni, K. J. Wilkinson, Diffusion coefficients of several rhodamine derivatives as determined by pulsed field gradient-nuclear magnetic resonance and fluorescence correlation spectroscopy, J. Fluoresc. 18 (2008) 1093-1101.
53. C. Chmelik, H. VoR, H. Bux, J. Caro, Adsorption and diffusion—Basis for molecular understanding of permeation through molecular sieve membranes, Chem Ing Tech 83 (2011) 104-112.
54. B. Mi, Graphene oxide membranes for ionic and molecular sieving, Science 343 (2014) 740-742.
55. 1.1. Vlasov, A. A. Shiryaev, T. Rendler, S. Steinert, S.-. Lee, D. Antonov, M. Voros, F. Jelezko, A. V. Fisenko, L. F. Semjonova, J. Biskupek, U. Kaiser, 0.1. Lebedev, I. Sildos, P. R. Hemmer, V. I. Konov, A. Gali, J. Wrachtrup, Molecular-sized fluorescent nanodiamonds, Nat. Nanotechnol. 9 (2014) 54-58.
56. P.-. Gendron, F. Avaltroni, K. J. Wilkinson, Diffusion coefficients of several rhodamine derivatives as determined by pulsed field gradient-nuclear magnetic resonance and fluorescence correlation spectroscopy, J. Fluoresc. 18 (2008) 1093-1101.

The invention claimed is:

1. A double-layered material consisting of a cellulose nanofibrous (CNF) layer and a graphene oxide (GO) nanolayer coating, wherein the double-layered material comprises 1-2 wt. % of GO in relation to a total weight of the double-layered material, the GO nanolayer coating has a thickness of about 100-220 nm, the double-layered material has a thickness of 19.3±4.0 µm, and the CNF layer is free of a chemical cross-linker.

2. The double-layered material according to claim 1, wherein a pore size of the double-layered material is 5-10 nm as measured with the Barrett-Joyner-Halenda (BJH) method.

3. The double layered material according to claim 1, wherein the double-layered material has one surface with the GO nanolayer coating, wherein the surface zeta potential of the surface with the GO nanolayer coating is below −50 mV.

4. A method for purification of water, comprising passing the water through a double-layered material consisting of a cellulose nanofibrous (CNF) layer and a graphene oxide (GO) nanolayer coating, wherein the double-layered material comprises 1-2 wt. % of GO in relation to a total weight of the double-layered material, the GO nanolayer coating has a thickness of about 100-220 nm, the double-layered material has a thickness of 19.3±4.0 µm, and the CNF layer is free of a chemical cross-linker, such that particles present in said water are removed from the water by said double-layered material.

5. A method for manufacturing a double-layered material, comprising the steps of:
   a) obtaining a cellulose nanofibrous (CNF) suspension, dispersing said CNF suspension in water to form a CNF dispersion, and sonicating said CNF dispersion;
   b) forming a CNF layer of the CNF dispersion formed in step a) to form a substrate;
   c) obtaining a GO suspension in water, dispersing said GO suspension in water to form a GO dispersion, and sonicating said GO dispersion;
   d) applying the GO dispersion formed in step c) to the substrate layer as a coating on top of the CNF layer formed in step b) to obtain a double-layered material; and
   e) drying the double-layered material obtained in step d);
   wherein the substrate consists of the CNF layer the GO nanolayer coating has a thickness of about 100-220 nm, the double-layered material has a thickness of 19.3±4.0 µm, and the CNF layer is free of a chemical cross-linker.

6. The method according to claim 5, wherein steps b) and d) are performed using vacuum filtration, and in step b) the CNF layer is formed on a substrate filter paper, and further comprising a step f) peeling off the double-layered material from the substrate filter paper.

7. The method according to claim 5, wherein the double-layered material is formed using roller coating or spray coating.

8. The method of claim 5, wherein the double-layered material comprises 1-2 wt. % of GO in relation to a total weight of the double-layered material.

9. The double-layered material according to claim 1, wherein the GO nanolayer coating has a thickness of 100-200 nm.

10. The double-layered material according to claim 1, wherein the double-layered material is characterized by an increased water permeability (L/m$^{-2}$·L/·h·bar), compared to the water permeability of the CNF layer alone.

11. The double-layered material according to claim 1, wherein the increased water permeability is increased at least 5-fold, compared to the water permeability of the CNF layer alone.

12. The double-layered material according to claim 1, wherein the double-layered material comprises standing GO sheets inserted into the CNF layer.

* * * * *